United States Patent
Jain et al.

(10) Patent No.: US 12,423,849 B2
(45) Date of Patent: Sep. 23, 2025

(54) SYSTEMS AND METHODS FOR HYBRID DEPTH REGULARIZATION

(71) Applicant: Adeia Imaging LLC, San Jose, CA (US)

(72) Inventors: Ankit Jain, Mountain View, CA (US); Priyam Chatterjee, Sunnyvale, CA (US); Kartik Venkataraman, San Jose, CA (US)

(73) Assignee: Adeia Imaging LLC, San Jose, CA (US)

( * ) Notice: Subject to any disclaimer, the term of this patent is extended or adjusted under 35 U.S.C. 154(b) by 0 days.

(21) Appl. No.: 18/632,171

(22) Filed: Apr. 10, 2024

(65) Prior Publication Data

US 2024/0346675 A1 Oct. 17, 2024

Related U.S. Application Data

(63) Continuation of application No. 18/153,856, filed on Jan. 12, 2023, now Pat. No. 11,983,893, which is a (Continued)

(51) Int. Cl.
*G06T 7/593* (2017.01)
*G06T 5/30* (2006.01)
(Continued)

(52) U.S. Cl.
CPC ............... *G06T 7/593* (2017.01); *G06T 5/30* (2013.01); *G06T 5/50* (2013.01); *G06T 7/11* (2017.01);
(Continued)

(58) Field of Classification Search
CPC ..... G06T 7/11; G06T 7/13; G06T 7/44; G06T 7/136; G06T 7/194; G06T 7/593;
(Continued)

(56) References Cited

U.S. PATENT DOCUMENTS 10,242,454 B2 † 3/2019 Schmidt
2013/0095920 A1 † 4/2013 Patiejunas
2017/0054967 A1 † 2/2017 Zhang

OTHER PUBLICATIONS

Extended European Search Report for European Application No. 24171265.2, Search completed Oct. 17, 2024, Mailed Nov. 5, 2024, 10 Pgs.

† cited by third party

*Primary Examiner* — Daniel G Mariam
(74) *Attorney, Agent, or Firm* — KPPB LLP

(57) ABSTRACT

Systems and methods for hybrid depth regularization in accordance with various embodiments of the invention are disclosed. In one embodiment of the invention, a depth sensing system comprises a plurality of cameras; a processor; and a memory containing an image processing application. The image processing application may direct the processor to obtain image data for a plurality of images from multiple viewpoints, the image data comprising a reference image and at least one alternate view image; generate a raw depth map using a first depth estimation process, and a confidence map; and generate a regularized depth map. The regularized depth map may be generated by computing a secondary depth map using a second different depth estimation process; and computing a composite depth map by selecting depth estimates from the raw depth map and the secondary depth map based on the confidence map.

22 Claims, 25 Drawing Sheets

Related U.S. Application Data continuation of application No. 17/078,732, filed on Oct. 23, 2020, now Pat. No. 11,562,498, which is a continuation of application No. 16/685,881, filed on Nov. 15, 2019, now Pat. No. 10,818,026, which is a continuation of application No. 15/682,295, filed on Aug. 21, 2017, now Pat. No. 10,482,618.

(51) Int. Cl.
    *G06T 5/50*    (2006.01)
    *G06T 7/11*    (2017.01)
    *G06T 7/13*    (2017.01)
    *G06T 7/136*    (2017.01)
    *G06T 7/194*    (2017.01)
    *G06T 7/44*    (2017.01)

(52) U.S. Cl.
CPC ............... *G06T 7/13* (2017.01); *G06T 7/136* (2017.01); *G06T 7/194* (2017.01); *G06T 7/44* (2017.01); *G06T 2200/04* (2013.01); *G06T 2207/10012* (2013.01); *G06T 2207/10028* (2013.01); *G06T 2207/20028* (2013.01); *G06T 2207/20032* (2013.01); *G06T 2207/20036* (2013.01); *G06T 2207/20192* (2013.01)

(58) Field of Classification Search
CPC ... G06T 5/50; G06T 5/30; G06T 2207/10012; G06T 2207/10028; G06T 2207/20028; G06T 2207/20032; G06T 2207/20036; G06T 2207/20192; G06T 2200/04; H04N 2013/0081
See application file for complete search history.

595a

595b

595c

595d

595e

SYSTEMS AND METHODS FOR HYBRID DEPTH REGULARIZATION

CROSS-REFERENCE TO RELATED APPLICATIONS

The current application is a continuation of U.S. Non-Provisional patent application Ser. No. 18/153,856 entitled "System and Methods for Hybrid Depth Regularization" to Jain et al. filed Jan. 12, 2023, which is a continuation of U.S. Non-Provisional patent application Ser. No. 17/078,732 entitled "System and Methods for Hybrid Depth Regularization" to Jain et al. filed Oct. 23, 2020 and issued as U.S. U.S. Pat. No. 11,562,498 on Jan. 24, 2023, which is a continuation of U.S. Non-Provisional patent application Ser. No. 16/685,881 entitled "System and Methods for Hybrid Depth Regularization" to Jain et al. filed Nov. 15, 2019, which is a continuation of U.S. Non-Provisional patent application Ser. No. 15/682,295, entitled "System and Methods for Hybrid Depth Regularization" to Jain et al. filed Aug. 21, 2017 and issued as U.S. Pat. No. 10,482,618 on Nov. 19, 2019.

FIELD OF THE INVENTION

The present invention relates generally to estimating depth in images, and more specifically to systems and methods for hybrid depth regularization.

BACKGROUND

Computer stereo vision is used in a variety of contexts to obtain three-dimensional (3D) information from a scene using image data from two different viewpoints. Applications of stereo vision include 3D displays in entertainment, robotics, augmented reality, and other contexts to distinguish amongst positions of objects. Using principles of parallax, or by comparing the positions of objects within two differing views of a scene, relative depth information may be extracted to form a depth map indicating the distances of objects in a scene from a viewpoint.

SUMMARY OF THE INVENTION

Systems and methods for hybrid depth regularization in accordance with various embodiments of the invention are disclosed.

In one embodiment of the invention, a depth sensing system, comprises a plurality of cameras; a processor; a memory containing an image processing application. The image processing application directs the processor to obtain image data for a plurality of images from multiple viewpoints using the plurality of cameras, wherein the image data for the plurality of images comprises a reference image and at least one alternate view image; generate a raw depth map containing depth estimates for pixels within the reference image using the image data for the reference image and the image data for the at least one alternate view image using a first depth estimation process, and a confidence map describing reliability of depth estimates contained within the raw depth map; and generate a regularized depth map. The regularized depth map is generated by computing a secondary depth map containing depth estimates for pixels within the reference image using a second different depth estimation process; and computing a composite depth map by selecting depth estimates from the raw depth map and the secondary depth map, where a depth estimate for a pixel in the reference image is selected from the raw depth map when the depth estimate is indicated as being reliable by the confidence map.

In a further embodiment, the composite depth map is a first composite depth map and the image processing application further directs the processor to generate a regularized depth map by computing a second composite depth map. The second composite depth map is computed by applying a smoothing filter to depth estimates in the first composite depth map; computing an edge map using the filtered first composite depth map, where the edge map indicates pixels within the reference image that form part of an edge; and computing a second composite depth map by selecting depth estimates from the raw depth map and the filtered first composite depth map, where a depth estimate for a pixel in the reference image is selected from the raw depth map when the edge map indicates that the depth estimate is with respect to a pixel from the reference image that forms part of an edge.

In another embodiment, the smoothing filter is a median filter.

In a yet further embodiment, the image processing application further directs the processor to generate a regularized depth map by applying an edge preserving filter to the second composite depth map.

In yet another embodiment, the image processing application further directs the processor to apply an edge preserving filter to at least one region of the second composite depth map indicated as containing a depth discontinuity by the edge map.

In a still further embodiment, the edge preserving filter is a bilateral filter with weights determined using the raw depth map and the reference image.

In still another embodiment, the image processing application further directs the processor to compute the second composite depth map by applying edge detection to the filtered first composite depth map to result in an edge-detected depth map; and dilating the edge-detected depth map to result in the edge map.

In a further additional embodiment, the image processing application further directs the processor to generate a regularized depth map by identifying a first set of edges in the reference image; identifying a second set of edges in the edge map, the first and second sets of edges indicating regions with depth discontinuities; calculating a set of weights for areas in the second composite depth map based on the first and second sets of edges; and applying the edge preserving filter to the second composite depth map using the set of weights.

In another additional embodiment, the image processing application further directs the processor to generate a raw depth map containing depth estimates for pixels within the reference image using the image data for the reference image and the image data for the at least one alternate view image, and a confidence map describing reliability of depth estimates contained within the depth map, by measuring parallax observable between the reference image and the at least one alternate view image.

In another further embodiment, the image processing application further directs the processor to estimate depth based upon measured parallax observable between the reference image and the at least one alternate view image by measuring parallax by comparing the similarity of a pixel in the reference image to pixels in the at least one alternate view image determined based upon a plurality of depth samples using a cost function; estimating depth for the pixel in the reference image by identifying the sampled depth at which the cost function for a pixel in the reference image indicates the strongest match as being the estimated depth of the pixel.

In still another further embodiment, the image processing application further directs the processor to construct a cost volume in memory using costs determined using the cost function at each sampled depth.

In a still yet further embodiment, the image processing application further directs the processor to compute the secondary depth map based on the cost volume.

In still yet another embodiment, the image processing application further directs the processor to compute the secondary depth map using a second depth estimation process comprising downsampling the reference image and the cost volume; and estimating depths to enforce smooth depth transitions within the secondary depth map in textureless regions of the reference image using the cost volume.

In a further embodiment again, the image processing application further directs the processor to compute the composite depth map by determining that a depth estimate for a pixel from the raw depth map is reliable when a confidence value for the pixel from the confidence map is above a threshold.

In another embodiment again, the image processing application further directs the processor to identify at least one corresponding region within the reference image and the at least one alternate view image using at least one criterion; generate binary images with respect to the reference image and the at least one alternate view image based upon the identified at least one corresponding region; subtract shifted versions of the reference image and the at least one alternate view image when the shifts correspond to a plurality of depth samples to produce a shifted and subtracted image for each of the plurality of depth samples; identify boundaries within the shifted and subtracted images; identify areas of the boundaries within the shifted and subtracted images; and determine depth estimates for pixels at a boundary of an identified region in the reference image based upon the depth sample at which the area of the boundary in the shifted and subtracted image is minimized.

A depth sensing method, according to a yet further embodiment again, comprises obtaining image data for a plurality of images from multiple viewpoints using the plurality of cameras, wherein the image data for the plurality of images comprises a reference image and at least one alternate view image; generating a raw depth map containing depth estimates for pixels within the reference image using the image data for the reference image and the image data for the at least one alternate view image using a first depth estimation process, and a confidence map describing reliability of depth estimates contained within the raw depth map; and generating a regularized depth map. The regularized depth map is generated by computing a secondary depth map containing depth estimates for pixels within the reference image using a second different depth estimation process; and computing a composite depth map by selecting depth estimates from the raw depth map and the secondary depth map, where a depth estimate for a pixel in the reference image is selected from the raw depth map when the depth estimate is indicated as being reliable by the confidence map.

In yet another embodiment again, the composite depth map is a first composite depth map and generating a regularized depth map further comprises computing a second composite depth map by applying a smoothing filter to depth estimates in the first composite depth map; computing an edge map using the filtered first composite depth map, where the edge map indicates pixels within the reference image that form part of an edge; and computing a second composite depth map by selecting depth estimates from the raw depth map and the filtered first composite depth map, where a depth estimate for a pixel in the reference image is selected from the raw depth map when the edge map indicates that the depth estimate is with respect to a pixel from the reference image that forms part of an edge.

In a still further embodiment again, the smoothing filter is a median filter.

In still another embodiment again, generating a regularized depth map further comprises applying an edge preserving filter to the second composite depth map.

In a further additional embodiment again, the depth sensing method further comprises applying an edge preserving filter to at least one region of the second composite depth map indicated as containing a depth discontinuity by the edge map.

In another additional embodiment again, the edge preserving filter is a bilateral filter with weights determined using the raw depth map and the reference image.

In another further embodiment again, generating a regularized depth map further comprises identifying a first set of edges in the reference image: identifying a second set of edges in the edge map, the first and second sets of edges indicating regions with depth discontinuities; calculating a set of weights for areas in the second composite depth map based on the first and second sets of edges; and applying the edge preserving filter to the second composite depth map using the set of weights.

In still another further embodiment again, generating a raw depth map containing depth estimates for pixels within the reference image using the image data for the reference image and the image data for the at least one alternate view image, and a confidence map describing reliability of depth estimates contained within the depth map, further comprises measuring parallax observable between the reference image and the at least one alternate view image.

In a still yet further embodiment again, the depth sensing method further comprises estimating depth based upon measured parallax observable between the reference image and the at least one alternate view image by measuring parallax by comparing the similarity of a pixel in the reference image to pixels in the at least one alternate view image determined based upon a plurality of depth samples using a cost function; and estimating depth for the pixel in the reference image by identifying the sampled depth at which the cost function for a pixel in the reference image indicates the strongest match as being the estimated depth of the pixel.

In still yet another embodiment again, the depth sensing method further comprises generating cost volume using costs determined using the cost function at each sampled depth.

In a further embodiment, the depth sensing method further comprises computing the secondary depth map based on the cost volume.

In another embodiment, computing the secondary depth map using a second depth estimation process comprises downsampling the reference image and the cost volume; and estimating depths to enforce smooth depth transitions within the secondary depth map in textureless regions of the reference image using the cost volume.

In a yet further embodiment, computing the composite depth map further comprises determining that a depth estimate for a pixel from the raw depth map is reliable when a confidence value for the pixel from the confidence map is above a threshold.

In yet another embodiment, computing the second composite depth map further comprises applying edge detection to the filtered first composite depth map to result in an edge-detected depth map; and dilating the edge-detected depth map to result in the edge map.

In a still further embodiment, the depth sensing method further comprises identifying at least one corresponding region within the reference image and the at least one alternate view image using at least one criterion; generating binary images with respect to the reference image and the at least one alternate view image based upon the identified at least one corresponding region; subtracting shifted versions of the reference image and the at least one alternate view image when the shifts correspond to a plurality of depth samples to produce a shifted and subtracted image for each of the plurality of depth samples; identifying boundaries within the shifted and subtracted images; identifying areas of the boundaries within the shifted and subtracted images; and determining depth estimates for pixels at a boundary of an identified region in the reference image based upon the depth sample at which the area of the boundary in the shifted and subtracted image is minimized.

DETAILED DESCRIPTION

Turning now to the drawings, systems and methods for hybrid depth regularization in accordance with various embodiments of the invention are illustrated. In a number of applications, it is desirable for 3D displays to be rendered in real time. As an example and not by way of limitation, augmented reality (AR) can be used to provide computer-generated video, graphics and/or sound in the context of a real-world physical environment. AR can be used for entertainment such as but not limited to gaming, and may employ one or more various display technologies such as head-mounted displays, monitors, and/or hand-held devices. For live AR purposes, the corresponding depth data for a scene should also be calculated in real time so as to provide the relevant information for rendering 3D displays. However, the depth data used for real-time applications are often noisy and less than accurate.

Regularization is a technique whereby constraints are imposed on a computational model, based on priors or side information, to solve for a variable in the model from a set of noisy or incomplete measurements. Specifically, in the case of depth estimation from a passive stereo system, parallax measurements may only be well-defined in the presence of unambiguous features. Spatially periodic patterns or textureless regions are ill-posed in that a potentially large number of disparities could produce the minimizing cost from a local correspondence search. Non-Lambertian surfaces, occlusions, and spatially varying lens characteristics, among many other factors, may also introduce errors into depth estimates obtained by observing parallax evident in multiple images of a scene. Depth regularization seeks to mitigate noise and errors in parallax estimation resulting from both scene and system characteristics.

In many embodiments of the invention, processes for improvement of depth map quality are capable of being performed in real time, and may, for example, run at rates up to and in excess of 25 frames/second on a mobile processor in low-power mode. In a number of embodiments of the invention, depth regularization processes employ a hybrid of depth regularization (that traditionally optimizes all pixels simultaneously), and various other filtering techniques based upon the characteristics of different regions in a scene to increase computational efficiency. In a number of embodiments, regions within a scene are categorized into different types of regions and treated using region-specific techniques, with only certain regions being processed using computationally intensive depth regularization techniques. The cost functions, filters, and parameters discussed herein are particular examples, and the scope of the invention is not limited to these particular constraints. Systems and methods for performing hybrid depth regularization in accordance with various embodiments of the invention are discussed further below.

Processes for Performing Hybrid Depth Regularization

Figure 1A:
FIGS. 1A-B illustrate an image and a corresponding depth map.
Figure 1B:

A depth map is an image or image channel that contains information relating to distances from a viewpoint to surfaces of objects visible within a scene. By way of example, an image is shown in FIG. 1A with its corresponding depth map shown in FIG. 1B. While much of the discussion that follows involves correspondence between a color image and a depth map, image data can be acquired for the sole purpose of obtaining depth data. Accordingly, hybrid depth regularization processes in accordance with many embodiments of the invention generate depth maps for which no corresponding color image is generated. The depth map in FIG. 1B indicates distances to various objects in the scene and the background. Various imaging systems employing arrays of two or more cameras exist that are capable of capturing image data from the visible light and/or near infrared spectrum and producing a corresponding depth map including (but not limited to) the array camera systems described in U.S. Patent Publication No. 2016/0309134 entitled "Multi-Baseline Camera Array System Architecture for Depth Augmentation in VR/AR Applications", to Venkataraman et al., and U.S. Patent Publication No. 2011/0069189 entitled "Capturing and Processing of Images Using Monolithic Camera Array with Heterogeneous Imagers", to Venkataraman et al. The disclosures within U.S. Patent Publication Nos. 2016/0309134 and 2011/0069189 regarding the implementation of different array camera architectures including monolithic array cameras, non-monolithic array cameras, and arrays of array cameras is hereby incorporated by reference herein in its entirety.

Processes for hybrid depth regularization in accordance with many embodiments of the invention are used to improve the accuracy of depth maps. In many embodiments, the hybrid depth regularization processes are capable of executing in real-time to provide depth information for a variety of purposes including (but not limited to) previewing images generated through fusion and/or other computational imaging techniques, and/or generating user interfaces for augmented reality and mixed reality displays. Depth regularization processes similar to those described in U.S. Patent Publication No. 2015/0091900 entitled "Systems and Methods for Depth-Assisted Perspective Distortion Correction", to Yang et al., estimate depth globally, by augmenting a correlation cost function with a smoothness prior and other constraints, and solving the resulting optimization problem for all pixels simultaneously. In situations with certain computational bandwidth and memory limitations, this approach may not be practical. Further, different components of a mobile chipset, such as the digital/image signal processor (DSP/ISP), central processing unit (CPU), or graphics processing unit (GPU), may be better suited for different tasks and have varying resources, to perform different modules of an overall process.

Figure 2:
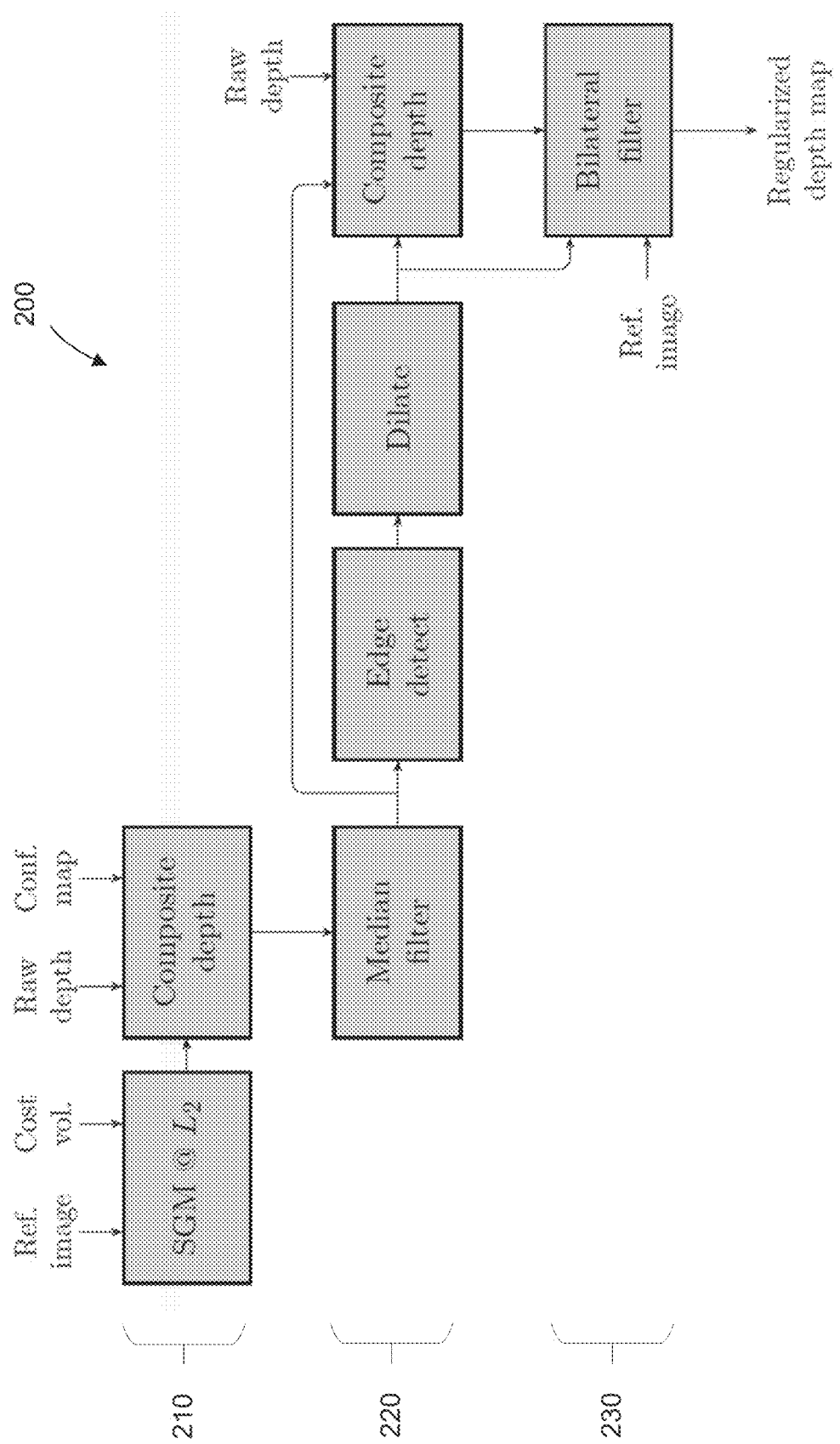
FIG. 2 illustrates a conceptual diagram of a hybrid depth regularization method in accordance with an embodiment of the invention.

FIG. 2 illustrates a conceptual diagram of a hybrid depth regularization method 200 with inputs and outputs, according to an embodiment of the invention. Each of three phases 210, 220 and 230, represented by a row in the diagram, treats pixels in a scene with similar characteristics. According to certain embodiments of the invention, the first phase 210 determines depths for textureless regions in an image (i.e. regions that do not possess distinctive features). In the second phase 220, the resulting depth map is denoised and depth discontinuities are detected. Finally in the third phase 230, the detected edges in depth are processed to be consistent with the image edges.

In a number of embodiments of the invention, the phases may be run sequentially rather than in parallel for relatively better depth map quality. As an example and not by way of limitation, using output from the first phase 210 in the second phase 220 may result in better performance requiring fewer steps, less parameterization, and reduced false alarm rate of depth discontinuity detection. These benefits may in turn reduce the required computations in the third phase 230, which may be considered a computationally intensive part of the process.

Figure 3:
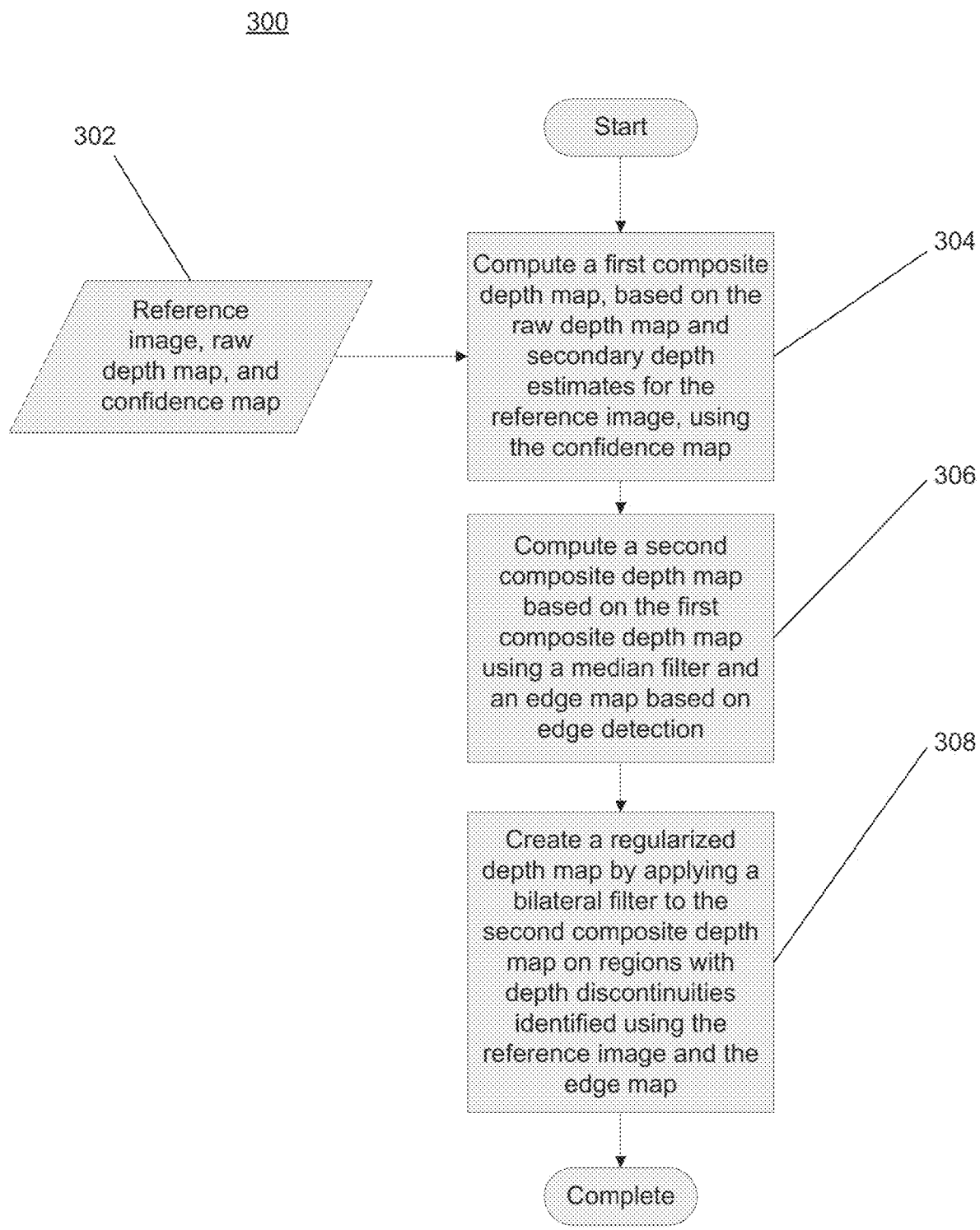
FIG. 3 is a flowchart illustrating a hybrid depth regularization process in accordance with an embodiment of the invention.
Figure 4A:
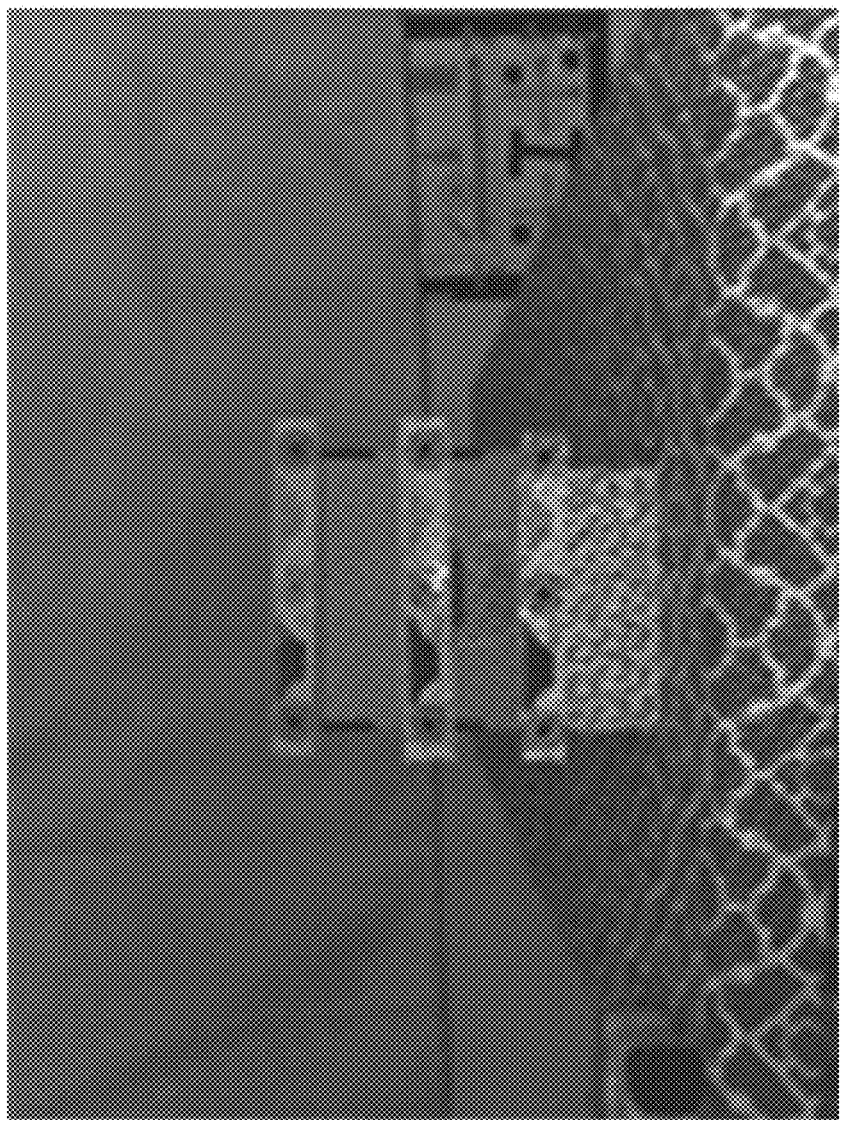
FIG. 4A shows a reference image after normalization stages in one implementation of a hybrid depth regularization process in accordance with an embodiment of the invention.
Figure 4B:
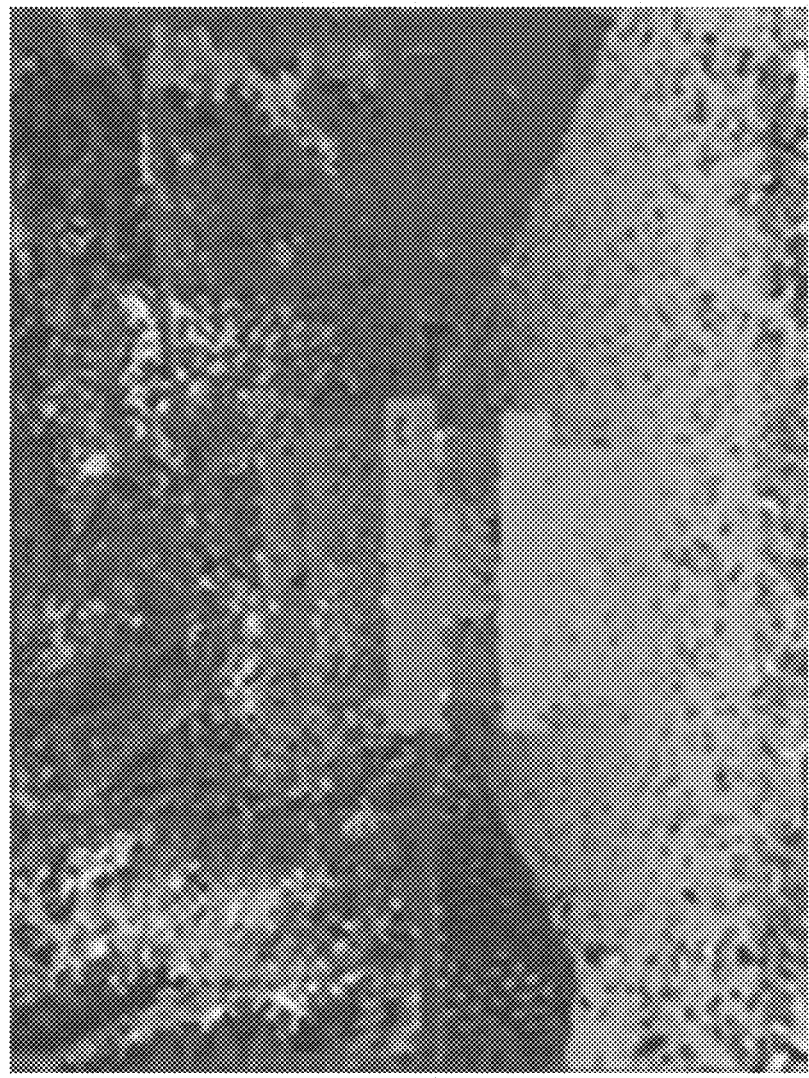
FIG. 4B shows a raw depth map from a parallax stage in one implementation of a hybrid depth regularization process in accordance with an embodiment of the invention.
Figure 4C:
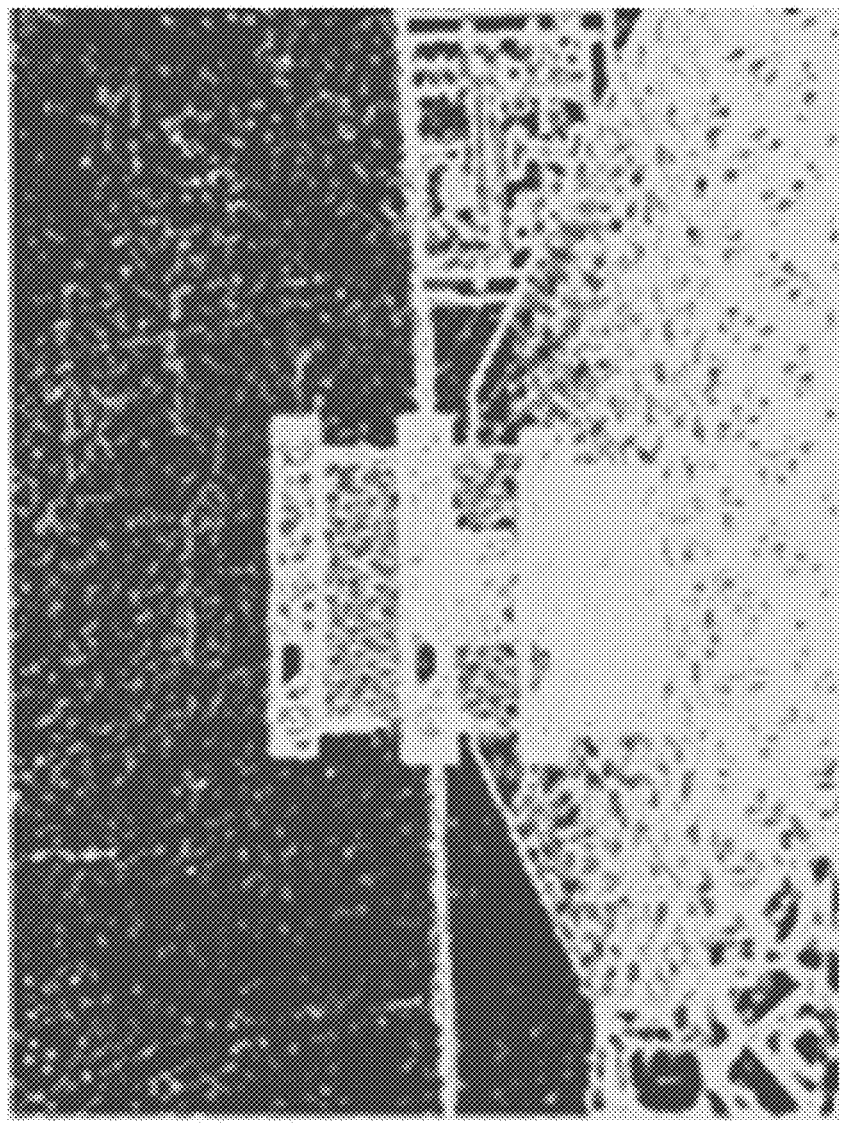
FIG. 4C shows a binary confidence map from a parallax stage in a hybrid depth regularization process in accordance with an embodiment of the invention.

A flowchart illustrating a hybrid depth regularization process 300 according to another embodiment of the invention is shown in FIG. 3. The process 300 includes obtaining (302) image data describing an image captured from multiple viewpoints, such as via a stereo configuration of cameras. The image data may include a reference image, a raw depth map, and a confidence map. The reference image is typically an image captured from one of the multiple viewpoints (as opposed to an image synthesized from a virtual viewpoint), with the raw depth map and confidence map being calculated based on principles of parallax. The depth map describes the distance from a given viewpoint to surfaces of objects visible within the image data, and the confidence map describes the strength of the depth predictions in the raw depth map. In several embodiments, the image data can be contained within an image file similar to any of the image file formats described in U.S. Pat. No. 8,542,933 entitled "Systems and Methods for Decoding Light Field Image Files" to Venkataraman et al. The disclosure in U.S. Pat. No. 8,542,933 concerning storing image data, depth map data, and auxiliary data such as (but not limited to) confidence map data and occluded pixel data, and extracting image data, depth map data, and auxiliary data from image files is hereby incorporated by reference in its entirety. In other embodiments, any of a variety of techniques for storing image data can be utilized as appropriate to the requirements of specific applications. Examples of a reference image 400, a raw depth map 410 and a confidence map 420 are shown in FIGS. 4A-C.

In the first phase of the process 300, depth estimates may be obtained for the textureless regions of the image. A first composite depth map 440 such as that shown in FIG. 4E may be computed (304) based on the raw depth map 410 and secondary depth estimates, such as in map 430 shown in FIG. 4D for the reference image 400, using the confidence map 420. In many embodiments, the secondary depth estimates are generated by utilizing matching costs utilized in the generation of the first depth map (often referred to as the cost volume) to generate depth estimates subject to a consistency constraint. In a number of embodiments, the secondary depth estimates prioritize smoothness in disparity transitions. In other embodiments, any of a variety of processes can be utilized to generate secondary depth estimates having increased confidence in textureless regions. In the second phase of the process 300, a second composite depth map 470 such as that shown in FIG. 4H may be computed (306) based on the first composite depth map 440. This may be performed using a median filter resulting in a median-filtered map 450 such as that shown in FIG. 4F, and an edge map 460 such as that shown in FIG. 4G based on edge detection. Finally, in the third phase of the process 300, a regularized depth map 480 such as that shown in FIG. 4I may be created (308) by applying a bilateral filter to the second composite depth map 470 on regions with depth discontinuities identified using the reference image 400 and the edge map 460. FIGS. 4A-I show potential inputs and outputs for a hybrid depth regularization process according to an embodiment of the invention, but serve merely as examples and are not intended to limit the scope of the invention. As noted above, a reference image may be utilized during hybrid depth regularization and then discarded prior to outputting a regularized depth map. The specific outputs of hybrid depth regularization processes in accordance with various embodiments of the invention are largely dependent upon the requirements of a given application. Further details of processes that may be performed in various phases according to a number of embodiments are described in the sections below.

Although specific processes are described above for hybrid depth regularization with reference to FIGS. 1A-B to 4A-I, any of a variety of processes can be utilized to improve depth map quality in real time in accordance with embodiments of the invention. Processes for the first phase of a hybrid depth regularization process in accordance with embodiments of the invention are discussed further below.

Phase 1: Flat Regions

The responsibility of the first phase of the hybrid depth regularization process according to many embodiments of the invention is to obtain depth estimates for the large, textureless regions of the image. In many regions, where there is a lack of reliable data and proximity to confident depth estimates, a global approach may be well suited for this phase.

Figure 5A:
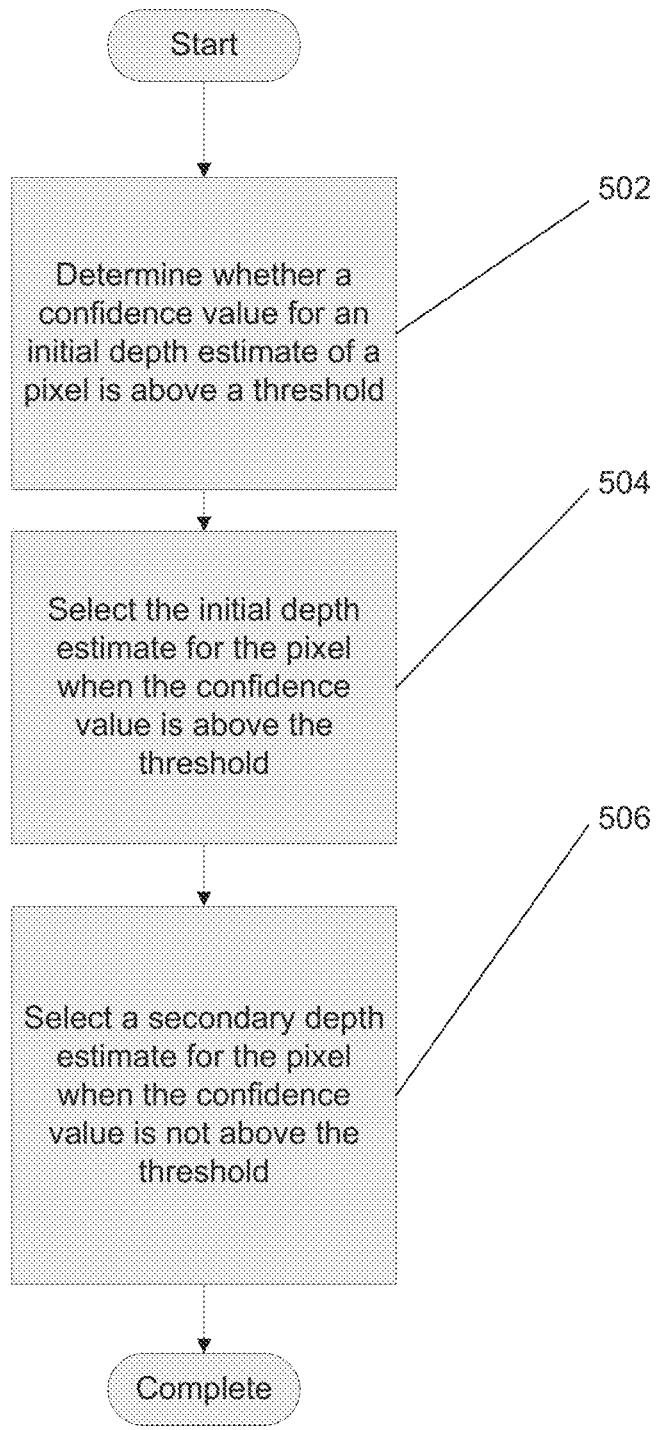
FIG. 5A is a flow chart illustrating a process for computing a first composite depth map in accordance with an embodiment of the invention.

In the first phase of hybrid depth regularization according to one embodiment of the invention, a first composite depth map may be computed using process 500 shown in FIG. 5A. Where the raw depth map includes initial depth estimates, and the confidence map includes confidence values for the initial depth estimates, it can be determined (502) whether the confidence value for the initial depth estimate of a pixel is above a threshold. The threshold may be pre-determined, and may be adjusted according to the specific requirements of an application. When the confidence value is above the threshold, the initial depth estimate may be selected (504) for the pixel. When the confidence value is not above the threshold, a secondary depth estimate for the pixel may be selected (506) instead.

Secondary depth estimates can be calculated using one or more of a variety of processes. In some embodiments of the invention, the image data includes a cost volume indicating matching cost values of pixels during the parallax stage, and the secondary depth estimates may be calculated based on the reference image and the cost volume. In this context, the term cost volume refers to the similarity metrics (also referred to as costs) for each pixel at each depth sample considered for that pixel. A typical depth map is generated based upon the cost for each pixel that indicates the best match. The cost volume provides information concerning other depths at which a pixel had similar cost functions. In a flat region, the cost volume is likely to indicate a number of depths at which similar pixels are observed from an alternative viewpoint. A pixel location for which depth is determined with high confidence is likely to have a single depth at which the matching metric is significantly stronger than at other depths sampled during the initial depth estimation process.

In certain embodiments, secondary depth estimates are obtained using subsampled versions of the image data for increased efficiency. Various approaches may be employed to calculate the secondary depth estimates. As an example and not by way of limitation, one such approach is the semi-global matching (SGM) technique as discussed in H. Hirschmuller, "Accurate and efficient stereo processing by semi-global matching and mutual information," in Proceedings of the 2005 IEEE Computer Society Conference on Computer Vision and Pattern Recognition (CVPR'05), (Washington, DC, USA), pp. 807-814, IEEE Computer Society, 2005, the relevant disclosure of which is hereby incorporated by reference. This method uses a series of one-dimensional optimizations rather than solving a fully global two-dimensional problem in order to economize on computation.

For purposes of filling in the flat regions of the scene, in some embodiments of the invention, SGM may be performed with downsampling, such as (but not limited to) $\frac{1}{16}$th the resolution of the camera (4× subsampling in each direction), to further reduce the amount of computation involved in filling in these regions. The cost volume from the parallax stage of the pipeline and the normalized reference image may be downsampled and processed through the SGM technique. The resulting depth map may be upscaled using nearest-neighbor interpolation. The resulting SGM output may serve as a set of secondary depth estimates. As noted above, the process forms a composite depth map by determining whether to utilize a secondary depth estimate produced through a process such as (but not limited to) SGM or the original depth estimate from the raw depth map based upon a criterion including (but not limited to) the confidence value of the depth estimate exceeding a threshold confidence level. When a raw depth estimate for a particular pixel has an associated high measure of confidence, that initial value is typically used. In other regions, the SGM estimates may be considered more reliable. This first composite depth map can serve as an input to the second phase of the hybrid depth regularization process. While the use of SGM to generate secondary estimates can be effective at achieving real time depth regularization at high frame rates, any of a variety of techniques can be utilized to produce depth estimates for pixels in the raw depth map having raw depth estimates determined with a low level of confidence. For example, hybrid depth regularization processes in accordance with many embodiments of the invention utilize a Laplacian based approach similar to the approach described in U.S. Patent Publication No. 2015/0254868 entitled "System and Methods for Depth Regularization and Semiautomatic Interactive Matting Using RGB-D Images", to Srikanth et al.

An issue that can be encountered when attempting to determine reliable depth estimates for flat or textureless regions is that approaches such as SGM and/or Laplacian approaches rely upon reliable depth estimates at the edges of the textureless regions. When a textureless region is part of the foreground of an image, depth estimates at the edges of the textureless region are typically sufficiently reliable. When a textureless region is located behind a foreground object, then a portion of the textureless region may not be visible in all of the images of the scene utilized to generate a depth estimate. The problem can be particularly acute when the raw depth map is estimated from a small number of cameras such as a stereo pair. When depth is estimated using a single pair of images, a portion of the textureless region that is visible in the reference image may not be visible in the second image (often referred to as an alternate view image) due to occlusion by a foreground object. When a region from the reference image is occluded in the alternate view image, the depth estimates for that region in the reference image are unreliable as a corresponding region does not exist in the alternate view image. Accordingly, a process that attempts to estimate depth in flat regions using depth estimates from an occluded region (i.e. a region that is not visible in alternate view image(s)) is likely to propagate the errors from the occluded region into at least some of the depth estimates generated for the rest of the flat region. In a number of embodiments, occluded regions are identified and depth estimates from occluded regions are excluded from the process utilized to generate the secondary depth estimates. In this way, highly unreliable depth estimates can be ignored increasing the accuracy of a composite depth map produced using the confident depth estimates from the raw depth map and the secondary depth estimates.

Figure 5B:
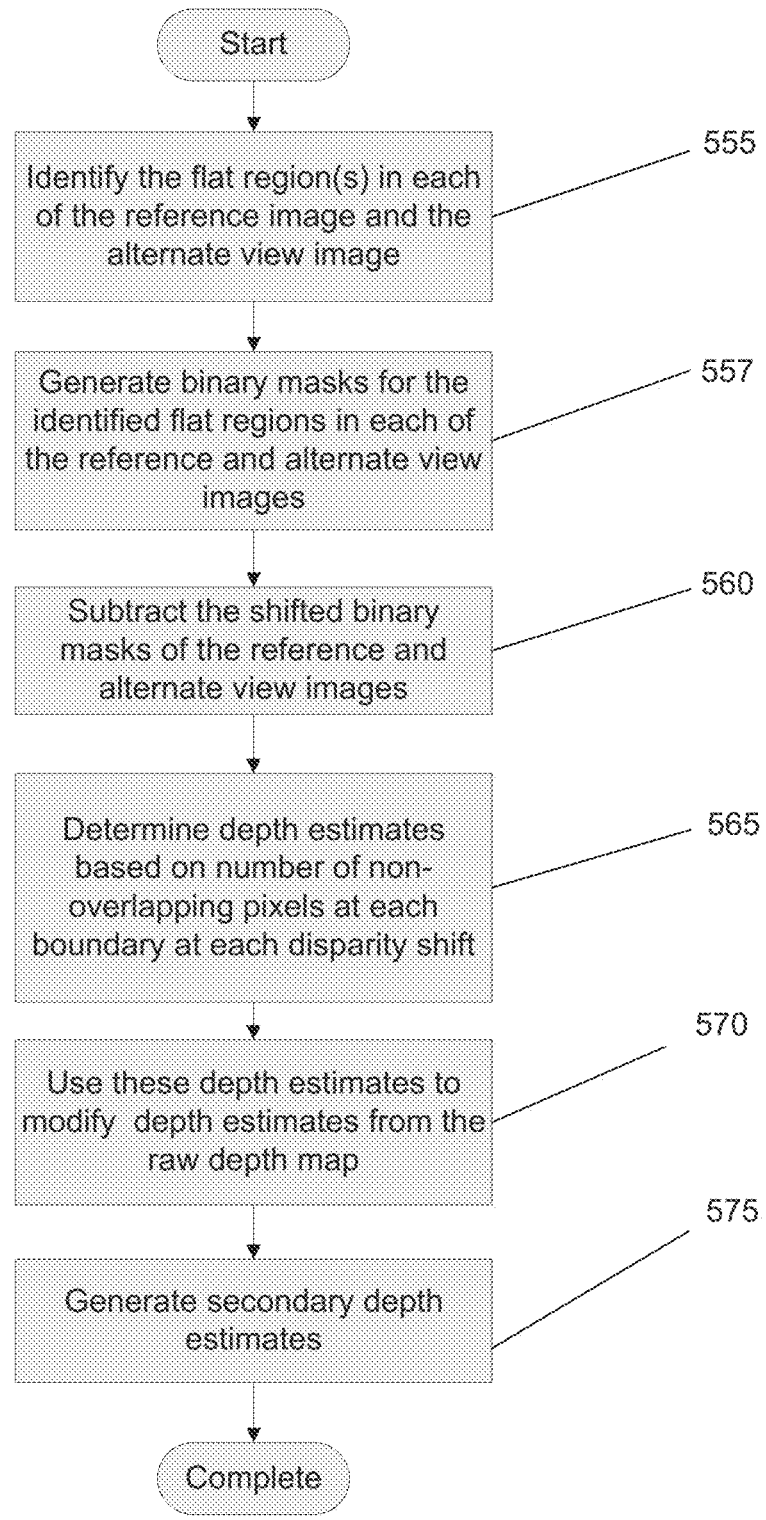
FIG. 5B is a flow chart illustrating a process for obtaining reliable depth estimates at the boundaries of flat regions that may be partially occluded in accordance with an embodiment of the invention.

In several embodiments, portions of flat regions that are occluded can be identified and reliable depth estimates for the portions of the flat regions that are occluded can be obtained by performing an additional depth estimation process such a that shown in FIG. 5B. In a number of embodiments, the depth estimation process involves identifying flat regions and then determining the disparity between the identified flat regions by comparing the locations of the flat regions in the reference image and at least one alternate view image. As noted above, flat regions that are surfaces of foreground objects will have similar shapes in reference and alternate view images (sources of variation can include but are not limited to curvature of the surfaces resulting in different visual hulls). When a flat region is partially occluded by a foreground object, the flat regions will have different shapes in each of the images. In many embodiments, pixels that form an occluded flat region can be utilized to generate a binary mask for each of the reference and alternate view image(s). Subtracting the reference image and an alternate view image at different disparity shifts will yield a binary image showing the extent to which the flat regions to do not overlap at each disparity shift (i.e. each depth that is sampled). When the shift (i.e. the depth that is sampled) corresponds to the actual depth of the flat region within the scene, the non-overlapping regions will be reduced. The presence of occlusions means that the flat regions have different shapes. Therefore, the non-overlapping regions will be minimized at the actual depth of the flat region but likely not eliminated entirely. When approaching the actual depth of the flat region, the non-overlapping regions will form boundaries at the edges of the flat regions. In several embodiments, depth estimates at multiple boundaries of a flat region are obtained by determining the disparity shifts that minimize the non-overlapping portions of the boundary at each of the edges. The edges can be determined by scanning along the direction of the shift to identify distinct non-overlapping regions separated by an overlapping region within the subtracted image. In this way, the process can determine reliable depth estimates at the boundaries of flat regions that do not have uniform depths.

A process for determining reliable depth estimates at the edges of a flat region visible in a reference image and that may be partially occluded in an alternate view image is illustrated in FIG. 5B. The process 550 includes identifying (555) the flat region(s) in each of the reference image and the alternate view image and then generating (557) binary masks for the identified flat regions in each of the reference and alternate view images. A comparison is performed at each of a plurality of disparity shifts (corresponding to discrete depth samples) involving subtracting (560) the shifted binary masks of the reference and alternate view images. The number of non-overlapping pixels at each boundary can then be determined (565) at each disparity shift.

In several embodiments, the reference and alternate view images are rectified so that the rows of the reference and alternate view images correspond to epipolar lines between the two cameras that captured the images. When rectified in this way, the number of non-overlapping pixels associated with a boundary can be determined by summing the non-overlapping pixels in each column. Edges can be identified based upon columns that include a number of pixels below a threshold. Accordingly, the total number of non-overlapping pixels in adjacent columns constituting an edge can be summed. The disparity shift at which the sum is minimized can be utilized as a reliable depth estimate for the pixels at the edge of the flat region. In other embodiments, the number of non-overlapping pixels corresponding to an edge of a flat region can be determined in any of a variety of ways appropriate to the requirements of a given application.

Referring again to the process 550 shown in FIG. 5B, depth estimates for pixels at the edges of the flat region in the reference image can be determined based upon the disparity shift that produces the smallest sum of the non-overlapping pixels at the edge of the flat region. These depth estimates can then be utilized to modify (570) depth estimates from the raw depth map prior to generating (575) the secondary depth estimates in a manner similar to the processes outlined above.

While specific processes for obtaining reliable depth estimates at the edges of flat regions are described above with reference to FIG. 5B, any of a variety of processes that determine reliable depth estimates that can then be utilized as seeds to determine depth estimates for other pixels within a flat region (including processes that involve the use of down sampled images) can be utilized as appropriate to the requirements of a given application.

In several embodiments of the invention, the SGM technique may be modified for handling occlusions with array cameras including three or more cameras by partitioning the array into groups of cameras and computing a separate cost volume for each group, where a reference camera is included in all the groups. For each group, a cost volume with respect to the extent to which pixels from different images at different depths match may be computed from the reference camera point of view. Using SGM, costs can be aggregated for each cost volume in a subset of the directions based on the arrangement of the cameras in each camera group. For instance, if the left half of an array is used as one camera group, then costs can be aggregated from directions that originate from the left side of a pixel. Once costs are aggregated for each camera group, the aggregated cost volumes can be combined. This can be done using various methods, such as (but not limited to) by determining the minimum cost from each camera group for each pixel and depth level, or in a nonlinear manner by summing the matching costs from each camera group if they are below a certain threshold and taking the minimum otherwise.

In SGM, where the data term, or parallax matching cost volume for pixel x at depth d (x being the 2D positional index of a pixel and d being the depth or disparity index), can be indicated by C(x,d)

and the prior term, or depth smoothness across pixels with similar intensities, can be indicated by $$\sum_{y \in N(x)} P_1 T(|d(x) - d(y)| = 1) + \sum_{y \in N(x)} P_2 T(|d(x) - d(y)| > 1)$$

where $y \in N(x)$ indicates neighborhood of x, and $$T(q) = \begin{cases} 1, & q \text{ is true} \\ 0, & q \text{ is false} \end{cases}$$

the global cost function term is indicated by $$E(d) = \sum_x \left[ C(x, d) + \sum_{y \in N(x)} P_1 T(|d(x) - d(y)| = 1) + \sum_{y \in N(x)} P_2 T(|d(x) - d(y)| > 1) \right]$$

Figure 5C:
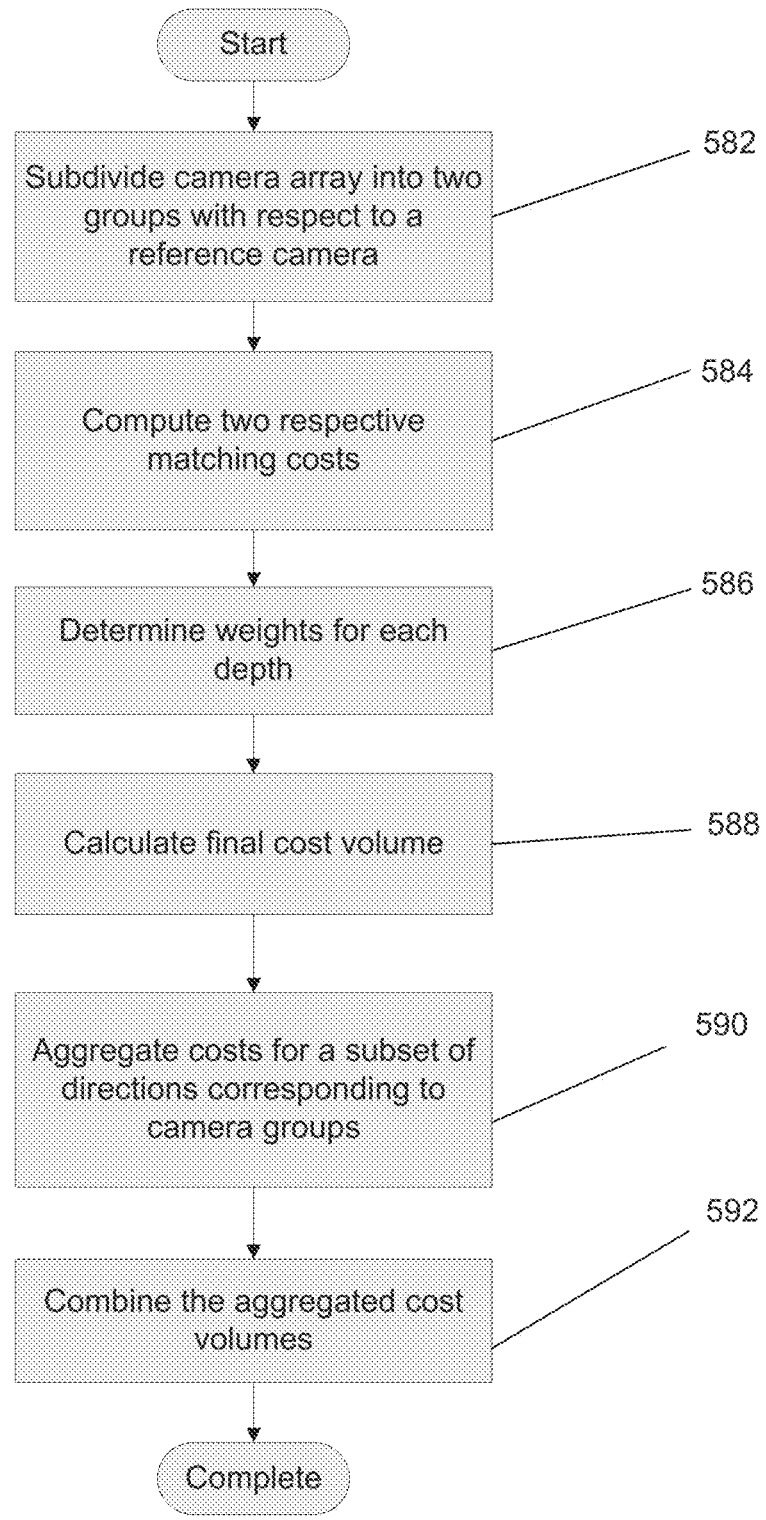
FIG. 5C is a flow chart illustrating a process for obtaining reliable depth estimates in occluded regions of image data from an array camera in accordance with an embodiment of the invention.

FIG. 5C shows a process for obtaining reliable depth estimates in occluded regions of image data from an array camera in accordance with an embodiment of the invention. The process 580 includes occlusion processing performed in two main stages including parallax matching cost computation and dense depth estimation via SGM. In the first stage, to increase the likelihood that the parallax matching cost volume provides useful information in occlusion zones, the camera array can be subdivided (582) into two groups $G_1$ and $G_2$ with respect to a reference camera. Two respective matching costs $C_1$ and $C_2$, may then be computed (584), where $$C_i(x, d) = \sum_{n \in G_i} |I_{ref}(x) - I_n(x - \delta_n(d))|$$

where $\delta_n(d)$ indicates the parallax-induced shift for camera n at depth d.

Weights may be determined (586) for each depth as $$\alpha_i(x, d) = \begin{cases} \dfrac{b_i}{\sum_j b_j}, & C_i(x, d) < y (I_{ref}(x)), \forall i \\ 1, & C_i(x, d) = \min_j (C_j(x, d)) \\ 0, & \text{otherwise} \end{cases}$$

where $b_i$ is the largest baseline in sub-group $G_i$ and $\gamma$ is a threshold based on the intensity $I_{ref}(x)$ of the reference pixel at x.

The final cost volume may then be obtained (588) as $$C(x, d) = \alpha_1(x, d) * C_1(x, d) + \alpha_2(x, d) * C_2(x, d)$$

where $\alpha_1 + \alpha_2 = 1$.

In many embodiments of the invention, SGM may then be employed to handle occlusions using direction partitioning. In the generic version of SGM, energies from all directions are summed. As an example and not by way of limitation, assuming eight directions 0-7, $$E(x, d) = \sum_{k=0}^{7} E_k(x, d)$$

where $\hat{d}(x) = \arg \min_d E(x, d)$.

Figure 5D:
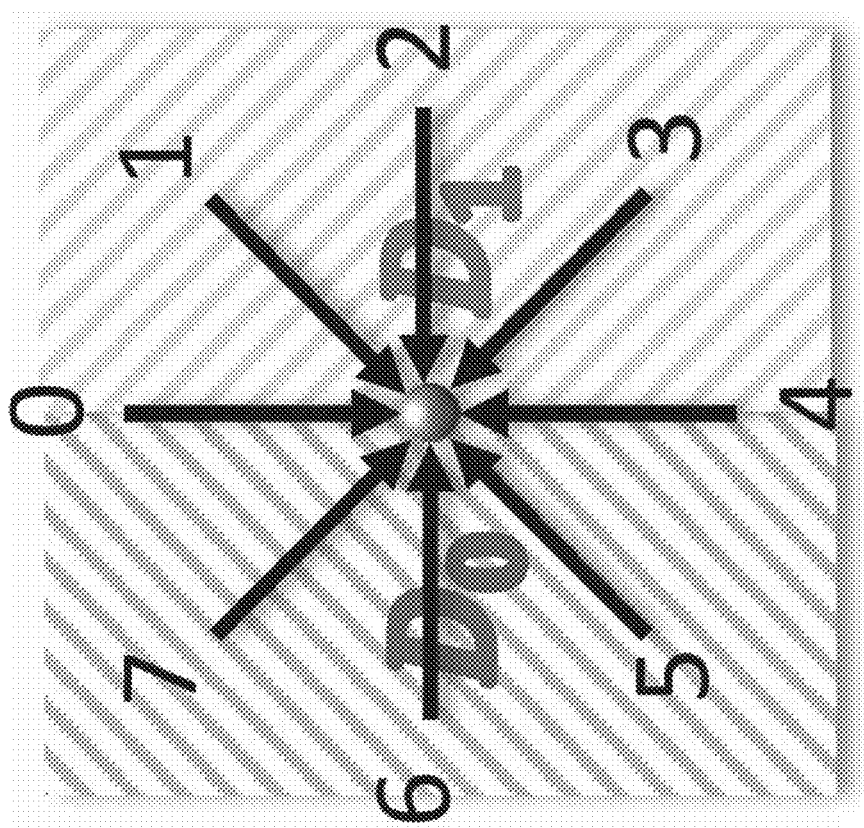
FIG. 5D shows an example of direction partitioning in accordance with an embodiment of the invention.

With direction partitioning in accordance with some embodiments of the invention, the SGM technique may be modified to aggregate (590) costs for a subset of directions corresponding to camera groups, and then combining (592) the aggregated cost volumes. As an example and not by way of limitation, assuming eight directional partitions 0-7 such as that shown in FIG. 5D, where $D_0 = \{0, 1, 2, 3, 4\}$
$D_1 = \{0, 4, 5, 6, 7\}$ the minimum energy may be chosen from $D_0$ and $D_1$. Thus, $$E(x, d) = \sum_{k \in D_i} E_k(x, d)$$

where $$E(x, d) = \min_i E^i(x, d)$$

$$\hat{d}(x) = \arg \min_d E(x, d)$$

While the above discussion assumes use of SGM across 8 directions, as can readily be appreciated any number of directions can be utilized and the directions partitioned in a manner appropriate to the relative locations of the cameras within a camera array. In a number of embodiments of the invention, the above method can provide improved depth estimates in occluded regions with small memory overhead for performing cost comparison. High costs due to occlusions can occur in a predictable direction from a depth edge based on the camera arrangement, so this knowledge may be used in cost aggregation with SGM or other optimization methods. Further, the cost volume may automatically incorporate the best matching costs for all occluded regions. In many embodiments, methods similar to those described above can utilize vectorization, and thus it is possible to perform optimization using vector instructions on a CPU.

In an alternative embodiment of the invention, separate costs (e.g., $C_1$ and $C_2$) may be retained for each sub-group, and two energy terms may be obtained using $C_i$ based on a direction partition. In other embodiments of the invention, alternatives for handling visibility in parallax matching may include, for example but not by way of limitation, accepting only the minimum cost at each depth, accepting the entire cost cube ci(x) for the sub-group with the least minimum cost at each x, or accepting the entire cost cube for a sub-group that estimates a background depth. Processes for determining subgroups with minimum costs that can be utilized in accordance with various embodiments of the invention are described in U.S. Pat. No. 8,619,082, the relevant disclosure from which including the disclosure related to estimation of depth using subsets of images obtained by an array of cameras is incorporated by reference herein in its entirety.

Figure 5E:
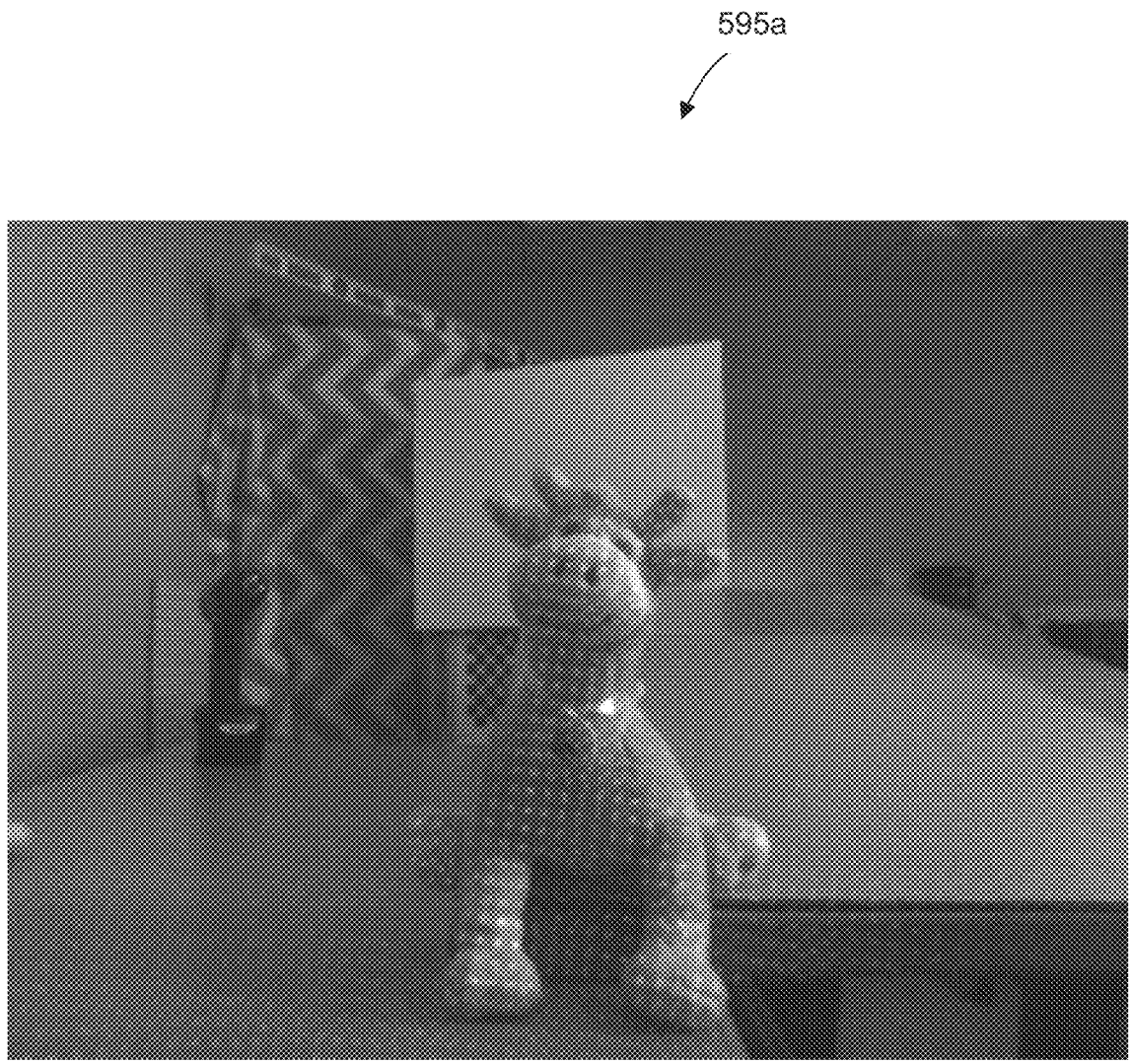
FIG. 5E shows a captured image in accordance with an embodiment of the invention.
Figure 5F:
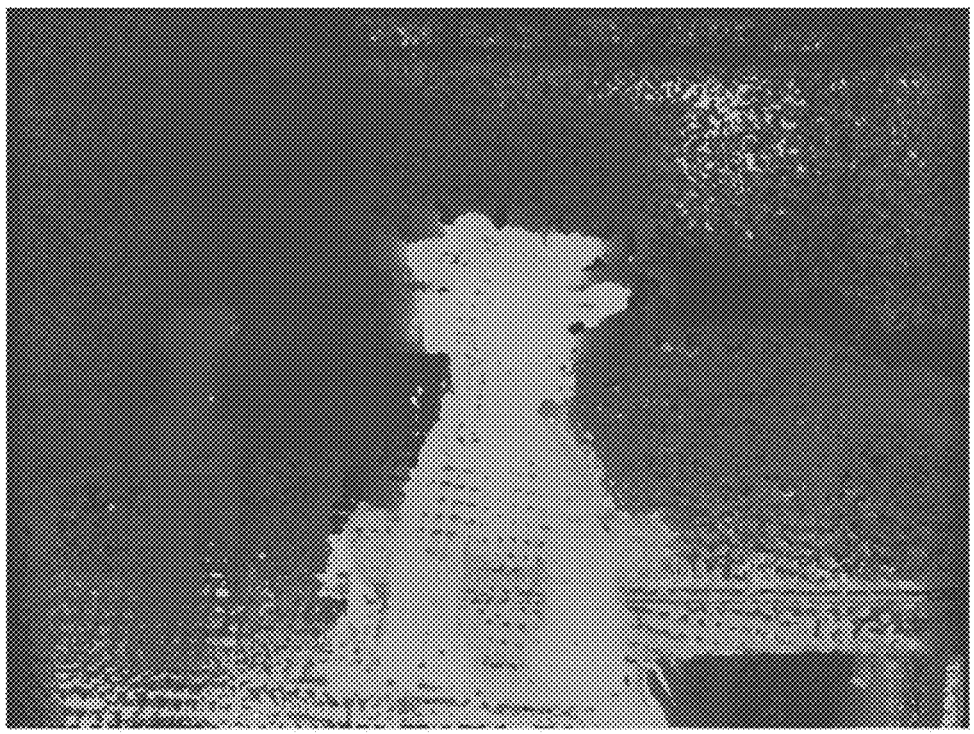
FIG. 5F shows a raw depth map and a regularized depth map for the captured image of FIG. 5E, using a generic SGM technique in accordance with an embodiment of the invention.
Figure 5F:
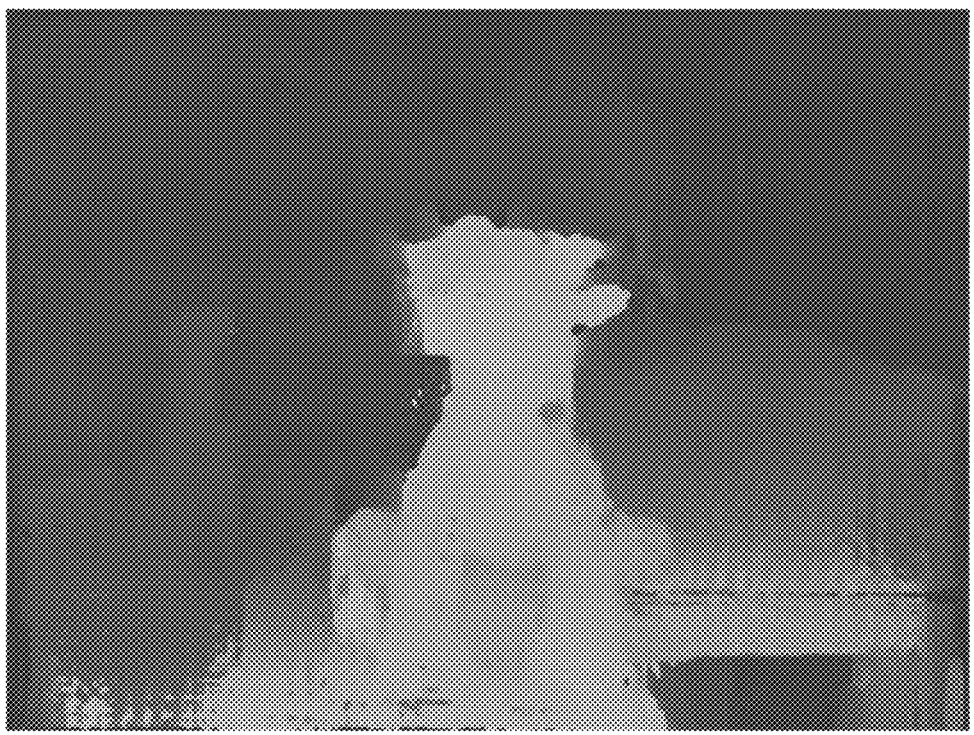
Figure 5G:
FIG. 5G shows a raw depth map and a regularized depth map for the captured image of FIG. 5E, using SGM with occlusion handling in accordance with an embodiment of the invention.
Figure 5G:

FIG. 5G illustrates examples of a raw depth map 595*d* and a regularized depth map 595*e* for a captured image 595*a* (shown in FIG. 5E) using SGM with occlusion handling in accordance with an embodiment of the invention. As compared to the raw depth map 595*b* and the regularized depth map 595*c* of FIG. 5F created using a generic SGM implementation for the same captured image 595*a*, it can be observed that depth estimation at occluded regions are considerably improved with depth bleeding reduced using with occlusion handling.

While specific processes for handling occlusions in image data from array cameras are described above with reference to FIGS. 5C-5G, any of a variety of processes that providing depth estimates in occluded regions from an array camera configuration can be utilized as appropriate to the requirements of a given application. Furthermore, although specific processes are described above for a first phase of a hybrid depth regularization process with reference to FIG. 5A, any of a variety of processes can be utilized appropriate to the requirements of a specific application in accordance with embodiments of the invention. Processes for the second phase of a hybrid depth regularization process in accordance with various embodiments of the invention are discussed further below.

Phase 2: Textured Regions

In a second phase of hybrid depth regularization processes according to several embodiments of the invention, noise can be removed from the depth map and depth discontinuities subsequently detected. Noise may come from parallax errors as discussed above, artifacts from the secondary depth estimation process such as but not limited to the process utilized to generate the secondary depth estimates (e.g. SGM), and disjoint composition in the first phase. Confident depth estimates can also be noisy due to errors in estimating confidence itself. Further, for the purpose of depth edge detection, it may be desirable to remove noise to avoid false detections. Since depth information is often very low frequency except for depth discontinuities, some embodiments of the invention may over-smooth in order to improve performance, with depth discontinuities being treated independently.

Figure 6:
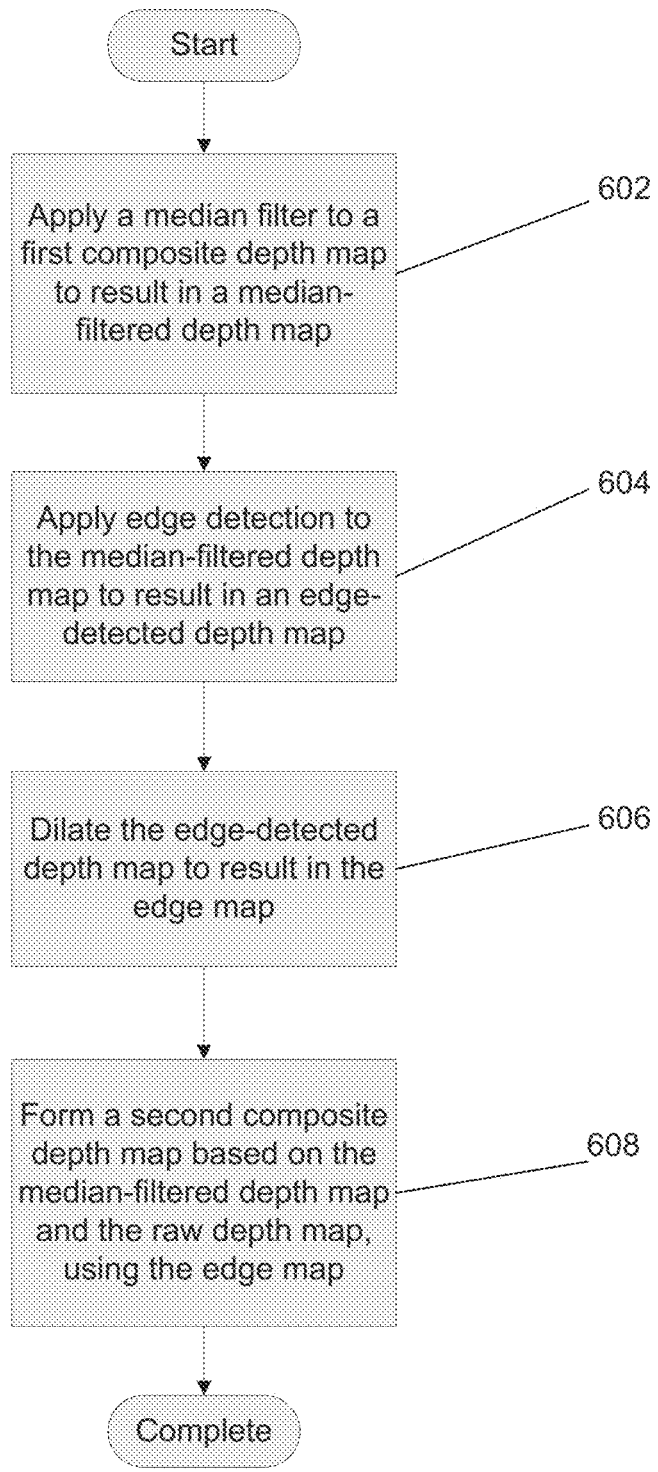
FIG. 6 is a flow chart illustrating a process for computing a second composite depth map in accordance with an embodiment of the invention.
Figure 7:
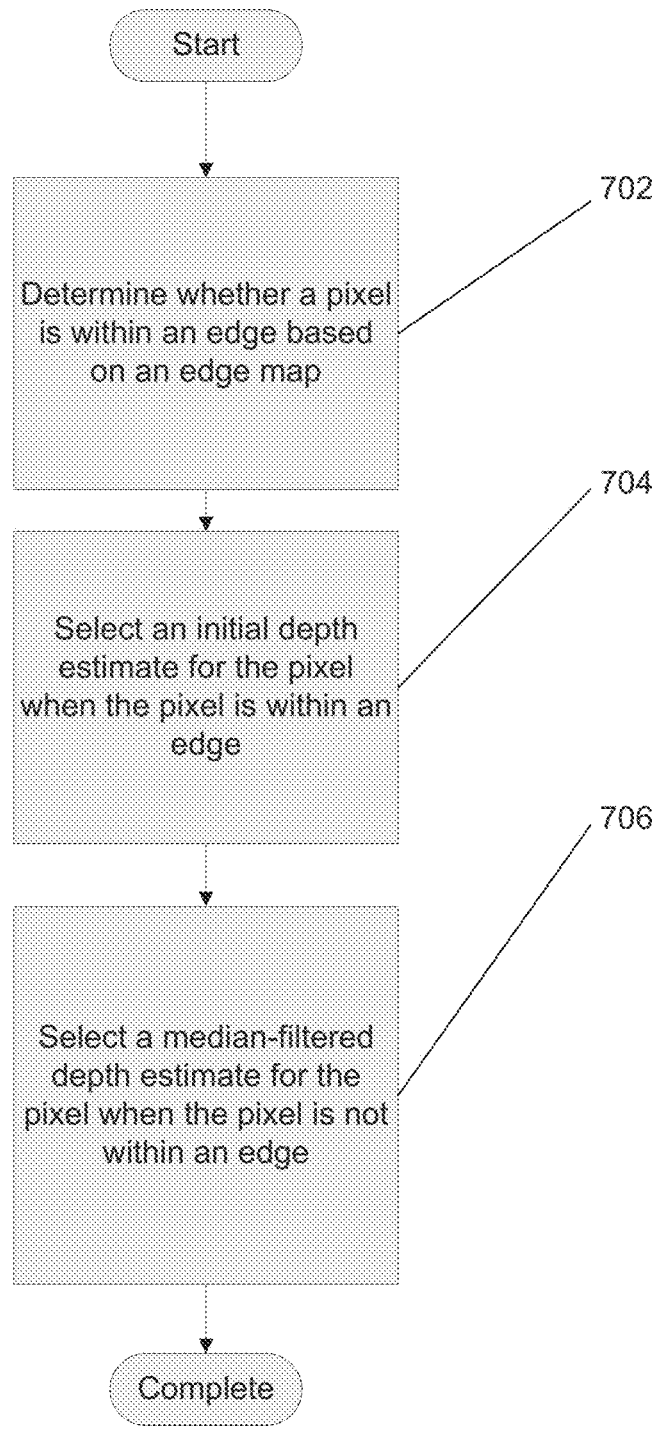
FIG. 7 is a flow chart illustrating another process for computing a second composite depth map in accordance with an embodiment of the invention.

Receiving a first composite depth map as an input from the first phase, the second phase may compute a second composite depth map using a process similar to the process 600 shown in FIG. 6. A median filter may be applied (602) to the first composite depth map, resulting in a median-filtered depth map. Edge detection may then be applied (604) to this median-filtered depth map to result in an edge-detected depth map. This edge-detected depth map may be dilated (606) to form an edge map. The dilation process can involve determining a region surrounding edges in the edge map. In many instances, depth estimates proximate edges of foreground objects can be unreliable due to the portion of the scene visible next to the edge in the reference image being occluded in an alternate view image. As is discussed further below, the unreliability of these depth estimates can lead to bleeding of depth from the reliable depth estimates of the foreground object. Therefore, dilating the edge map enables identification of pixels proximate an edge that may suffer from edge bleeding of high confidence depth estimates and avoid their being processed during the median-filtering of the first composite depth map. In many embodiments, the edge map is used to form (608) a second composite depth map based on the median-filtered depth map and the raw depth map, using the edge map.

Where the raw depth map includes initial depth estimates, and the median-filtered depth map includes median-filtered depth estimates, the second composite depth map may be further formed using a process 700 shown in FIG. 7 according to certain embodiments of the invention. It may be determined (702) whether a pixel is within an edge based on the edge map. If so, the initial depth estimate may be selected (704) for the pixel; if not, the median-filtered depth estimate may be selected (706) for the pixel.

As an example and not by way of limitation, the input first composite depth map from the previous phase may be filtered with a filter such as (but not limited to) 9×9 median filter. Sobel edge detection may be applied, followed by dilation with a 5×5 box structural element. The resulting binary mask may indicate pixels that should be processed by the third and final phase of the regularization process. According to some embodiments of the invention, dilating the edge map to obtain the binary mask can enable correction of depth bleeding, or the misalignment of depth and image edges. As noted above, depth bleeding often manifests as the assignment of foreground depth to pixels in the background beyond the boundary of the occluding object. Depth bleeding may occur due to cost aggregation in the parallax stage and median filtering in the present phase of depth regularization. Thus, the edge map may be dilated in order to assign pixels in the neighborhood of an edge, whose estimates are not necessarily reliable, to be processed using bilateral filtering in a subsequent phase.

In certain embodiments of the invention, the dilation element may be set to half of the median window size so that bleeding on either side of the detected depth edge is accounted for. Increasing the median window size can lower the number of edges that are detected, but the increased size of the requisite dilation element can balance this effect by widening the region of each detected edge. Thus, the total number of pixels in the mask remains roughly constant with median window size. As can readily be appreciated, any of a variety of techniques for detecting edges and for dilating an edge mask on either side of an edge can be utilized as appropriate to the requirements of a given application in accordance with various embodiments of the invention.

Once the binary mask denoting depth edges is obtained, the second composite depth map can be formed from the median-filtered and raw depth maps, using the depth edge binary mask to select the source of the depth estimate to utilize within the second composite depth map. This composition paints in the raw estimates in areas that are yet to be regularized in the next phase, and uses the median filtered values (from the secondary and confident initial depth estimates) everywhere else.

Although specific processes are described above for a second phase of a hybrid depth regularization process with reference to FIGS. 6-7, any of a variety of processes can be utilized appropriate to the requirements of a specific application in accordance with embodiments of the invention. Processes for regularizing depths around edges (i.e. depth discontinuities in depth maps) utilized within hybrid depth regularization process in accordance with various embodiments of the invention are discussed further below.

Phase 3: Depth Discontinuities

In many embodiments, the hybrid depth regularization process separately processes regions of the image which contain relatively large changes in depth (often referred to as depth discontinuities). These areas generally contain the high-frequency content of the depth map and may require heavy processing to enforce luminance-depth edge correlation therein.

Figure 8:
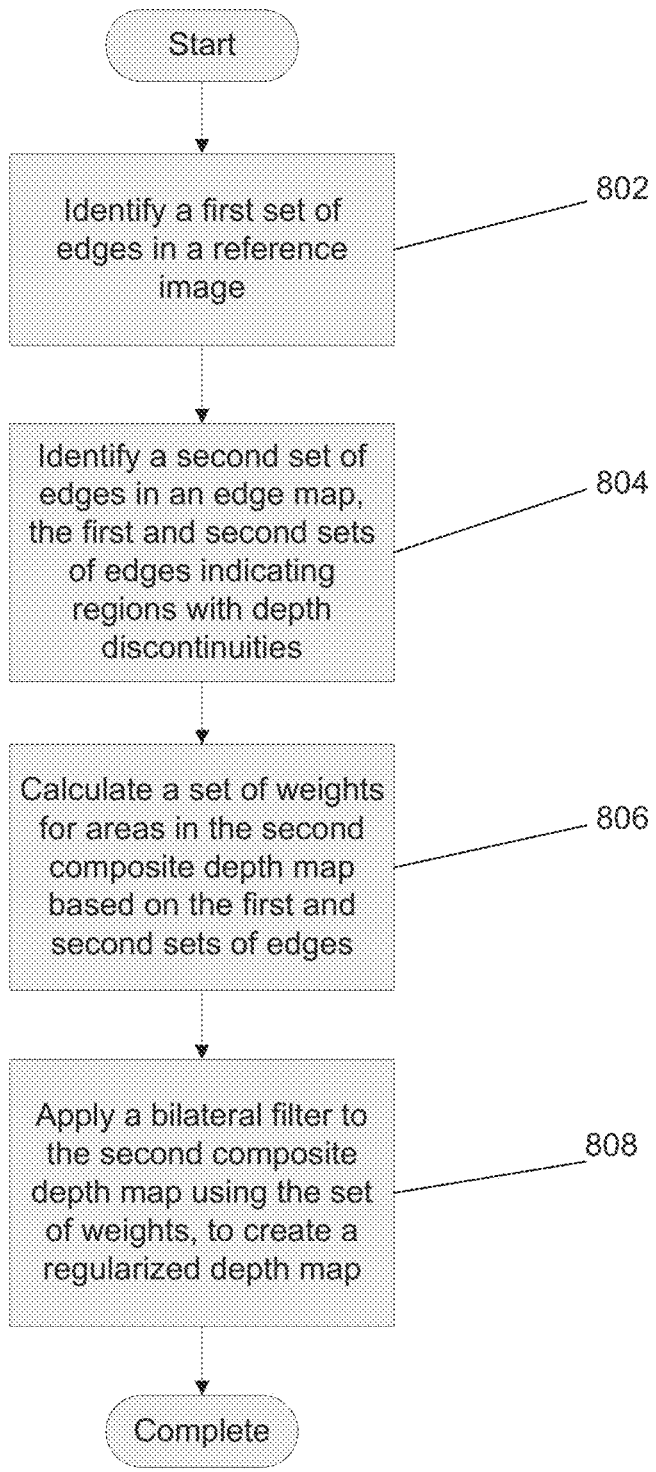
FIG. 8 is a flow chart illustrating a process for creating a regularized depth map in accordance with an embodiment of the invention.

In a number of embodiments, a depth map that has already been processed to regularize depth estimates in various regions of the depth map such as (but not limited to) the second composite depth map generated using processes similar to the processes described above with reference to FIGS. 7 and 8 can be utilized as an input to a process 800 that perform depth regularization in regions surrounding depth discontinuities. As shown in FIG. 8, a first set of edges may be identified (802) in the reference image, and a second set of edges identified (804) in the edge map. These first and second sets of edges can indicate regions with depth discontinuities. A set of weights may then be calculated (806) for areas in the second composite depth map based on the first and second sets of edges. These weights indicate the similarity of the depth and intensity and/or color information between a pixel and its surrounding pixels. Using the calculated set of weights, an edge preserving filter such as (but not limited to) a bilateral filter may be applied (808) to the second composite depth map, to create the final regularized depth map.

As an example and not by way of limitation, to accomplish the edge alignment, a joint bilateral weighted median filter may be used. The bilateral weights computed from the image may allow for image domain edge-guided filtering on the depth map. Choosing the median value based on these weights may provide robustness to noise from the underlying raw depth estimates and further preserve edges. Techniques may be employed from Z. Ma, K. He, Y. Wei, J. Sun, and E. Wu, "Constant time weighted median filtering for stereo matching and beyond," in 2013 IEEE International Conference on Computer Vision, pp. 49-56, December 2013, the relevant disclosure of which is hereby incorporated by reference.

The bilateral filter window size may be set to, for example, 17×17, about twice the median window size from the example in the above section. This may be done so that when the window is centered on the depth edge, its region of support will still include about 50% of previously filtered, non-noisy data. Other parameters, such as the range and domain standard deviations used in Gaussian weights, may be determined empirically.

In some embodiments of the invention, the median and/or other statistics are computed at a lower resolution to reduce computation. The statistics of the depth measurement in a given window may not change significantly with resolution, so it is possible for a high-resolution estimate to be computed at depth edge pixels without analyzing every pixel in the window. For example, in a 17×17 window, the median may be computed based on ¼ of the 289 pixels in the window. This may provide for significant increase in computational speed while sacrificing little depth quality.

In many instances, 10-20% of pixels are processed in this phase. However, due to large window sizes, pixel weight computation, and number of memory accesses, the computations from this phase may be an expensive part of the overall depth regularization process. The alignment of depth and image edges provided by this phase may be significant for applications such as adding bokeh effects and inserting virtual objects into a scene.

Although specific processes involving specific types of edge preserving filters are described above for a final phase of a hybrid depth regularization process with reference to FIG. 8, any of a variety of processes including any of a variety of techniques for smoothing noise while preserving depth discontinuities can be utilized as appropriate to the requirements of specific applications in accordance with various embodiments of the invention. Results of various hybrid depth regularization processes in accordance with embodiments of the invention are discussed further below.

Results

An example of results obtained performing a hybrid depth regularization process in accordance with an embodiment of the invention is illustrated in FIGS. 4A-4I, which show various intermediate computational products obtained during various phases of the hybrid depth regularization process. FIGS. 4A-4I show the inputs, intermediate results, and final output of real-time hybrid depth regularization for the data set. The scene consists of a textured tabletop receding in depth, three fronto-parallel boxes on top of it at different distances, and a largely untextured background. The normalized reference image 400, also reveals that an infrared (IR) pattern was projected across the scene, though it appears faint in the background. In this particular example, the bottom approximately 10% of the images in FIGS. 4A-I may be ignored. This is a region lacking field-of-view overlap between the cameras in the array, so the data here may be considered meaningless.

The raw depth map 410 from the parallax stage of the pipeline is the initial depth map upon which hybrid depth regularization seeks to improve. It can be seen that estimates in textured regions appear plausible, while estimates in most other places are noisy and the depth in the large background region is erroneous. The confidence map 420, also from the parallax stage of the pipeline, marks pixels where the raw depth estimate is believed to be reliable. The three images in FIGS. 4A-4C, along with the cost volume from the parallax stage (not pictured), form inputs to a first phase of the hybrid depth regularization.

Figure 4D:
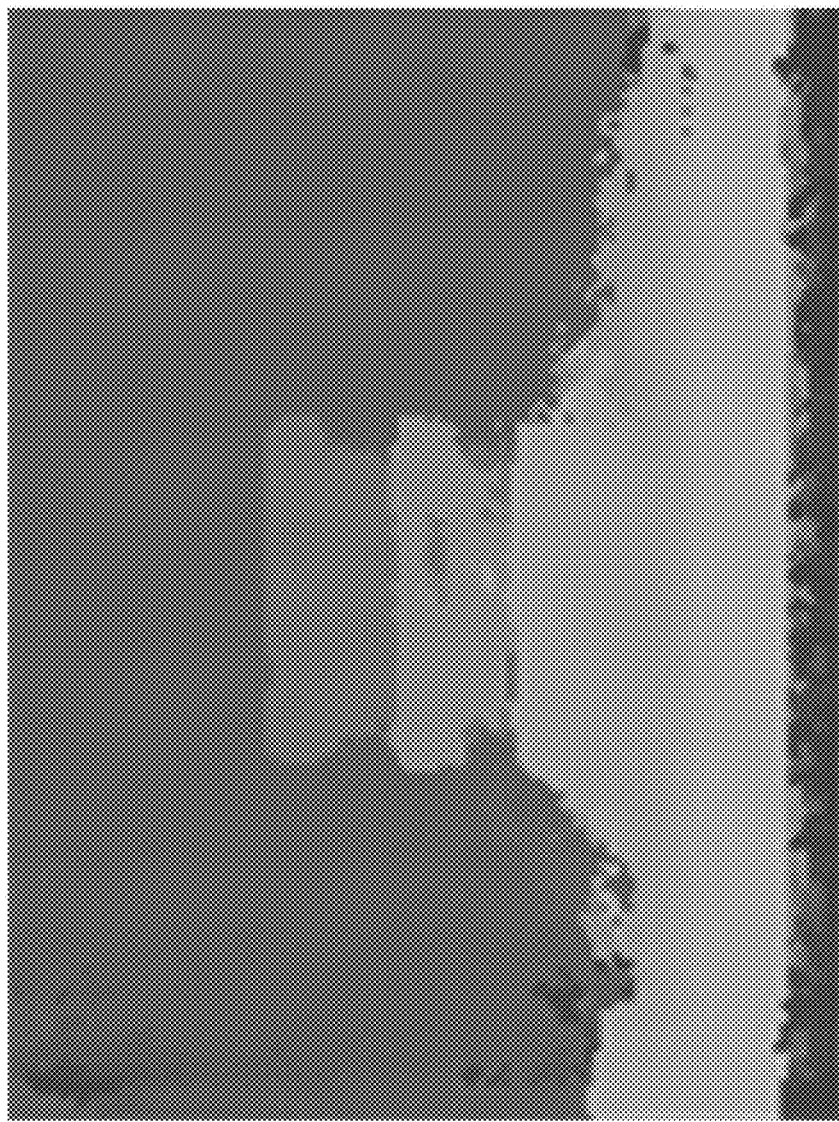
FIG. 4D shows a depth map with secondary depth estimates using semi-global matching (SGM) in a hybrid depth regularization process in accordance with an embodiment of the invention.
Figure 4E:
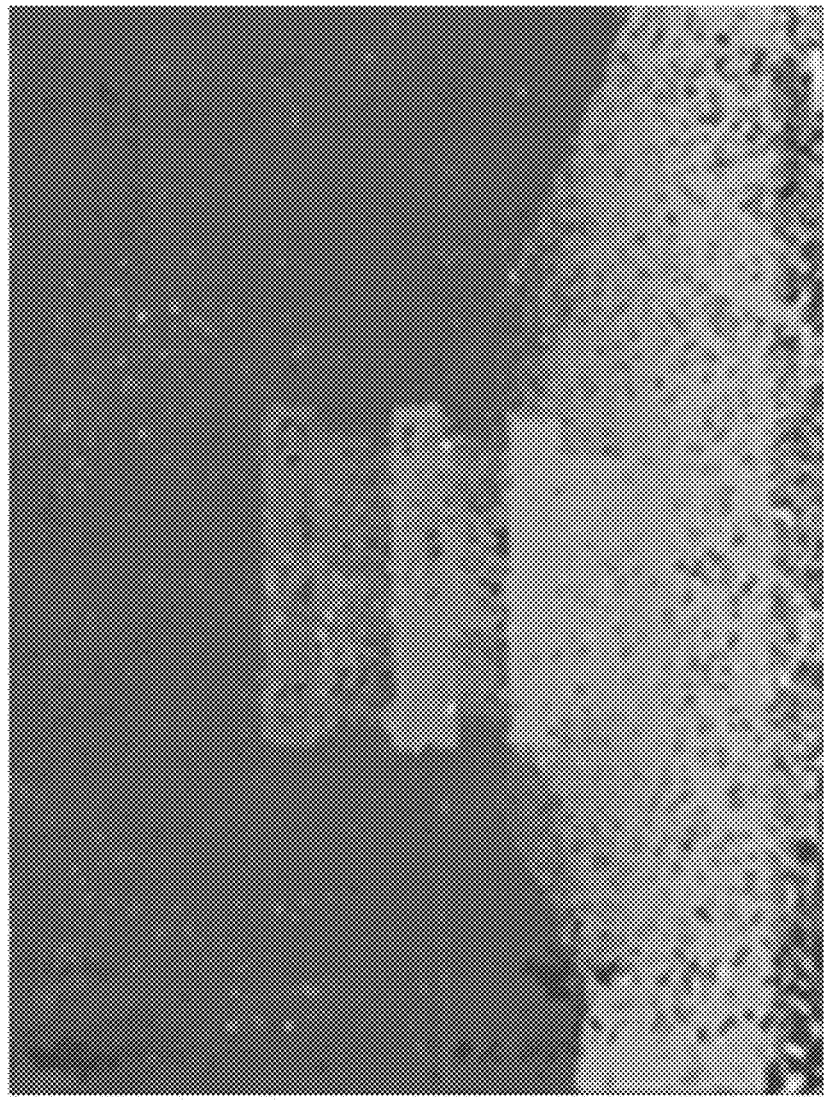
FIG. 4E shows a first composite depth map in a hybrid depth regularization process in accordance with an embodiment of the invention.

FIG. 4D shows an example of a set of secondary depth estimates 430 as output (and upsampled) from processing using an SGM technique similar to the SGM processes described above. While the depth may be considered insufficiently formed around the boxes and the distant parts of the tabletop, it has achieved its purpose of providing consistent estimates in the flat background region. Some streaking artifacts have been introduced into the background, which is typical of SGM in flat regions. The output from the first phase, the first composite depth map 440, is more consistent than the raw depth map 410.

Figure 4F:
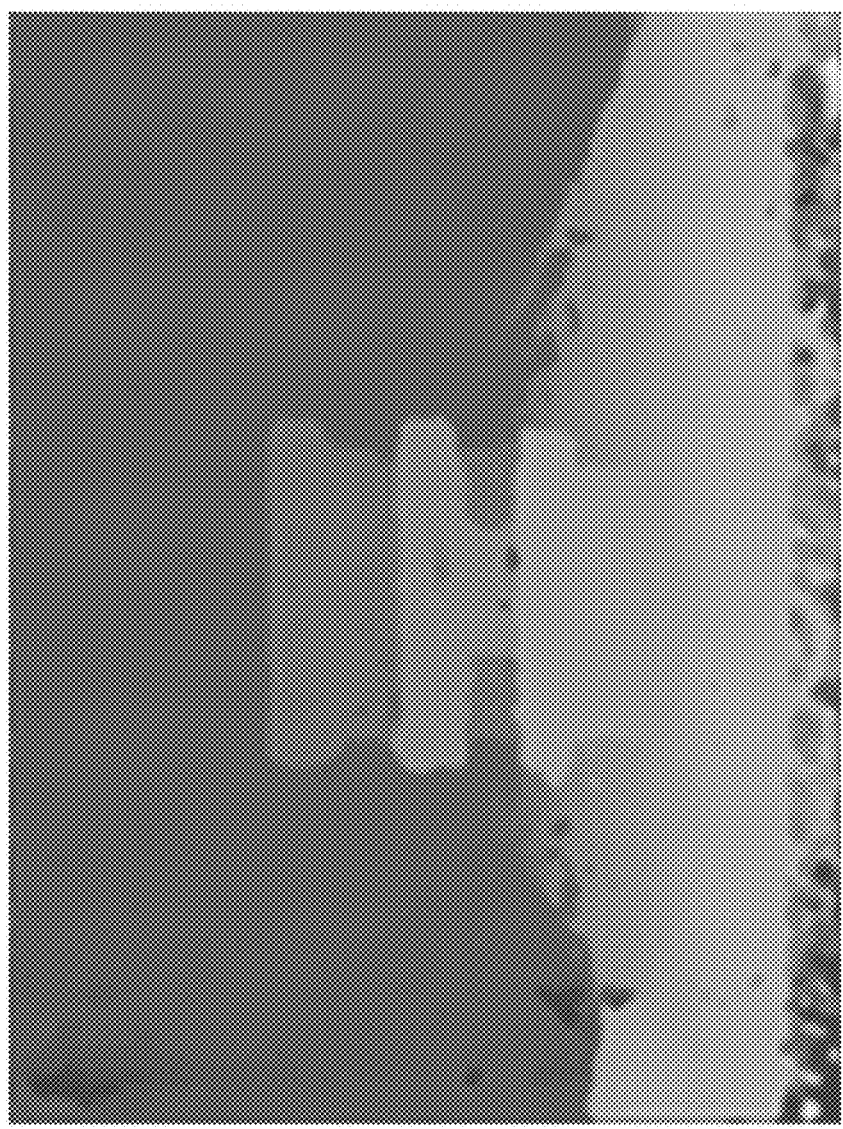
FIG. 4F shows a median-filtered depth map in a hybrid depth regularization process in accordance with an embodiment of the invention.
Figure 4G:
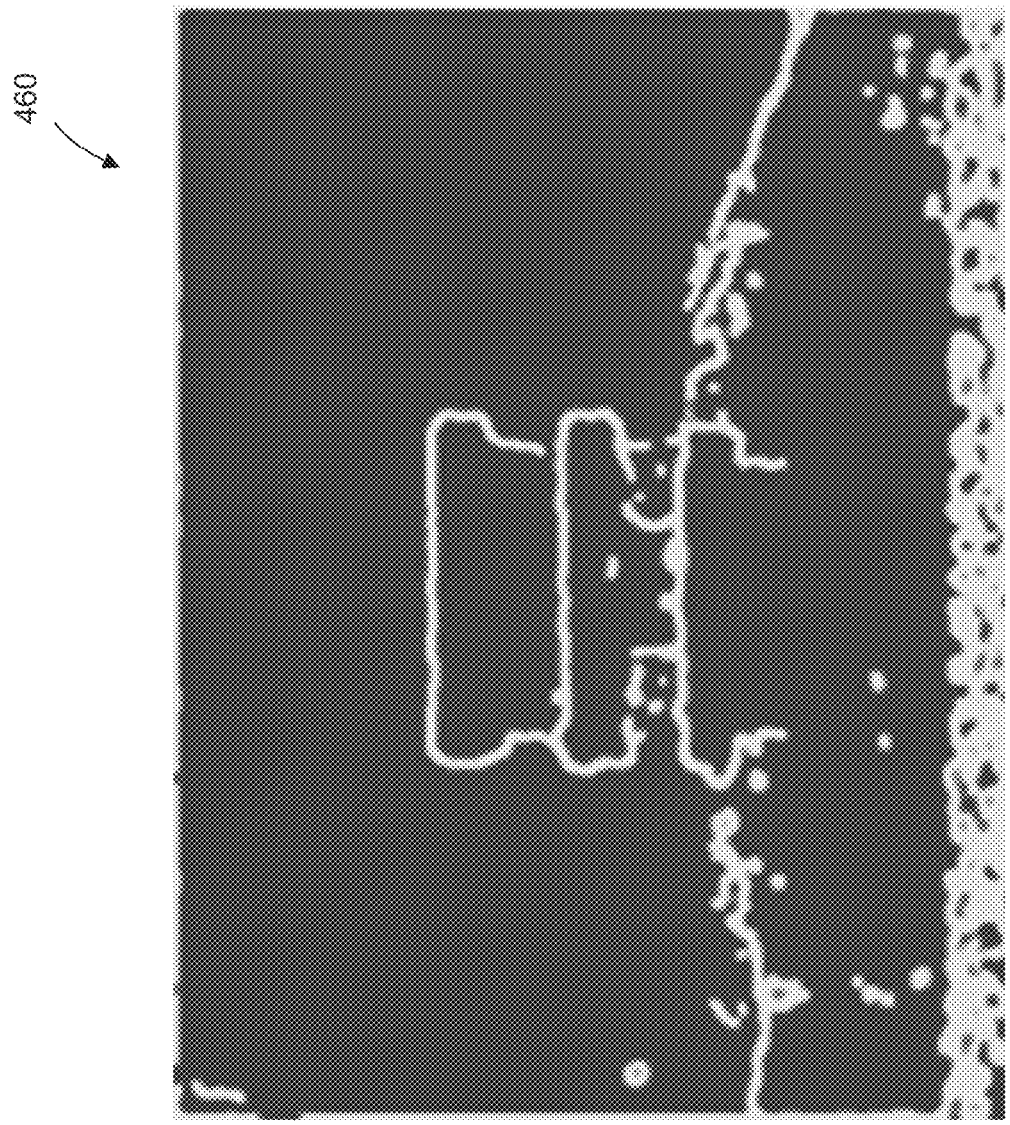
FIG. 4G shows a binary edge map of depth discontinuities in a hybrid depth regularization process in accordance with an embodiment of the invention.
Figure 4H:
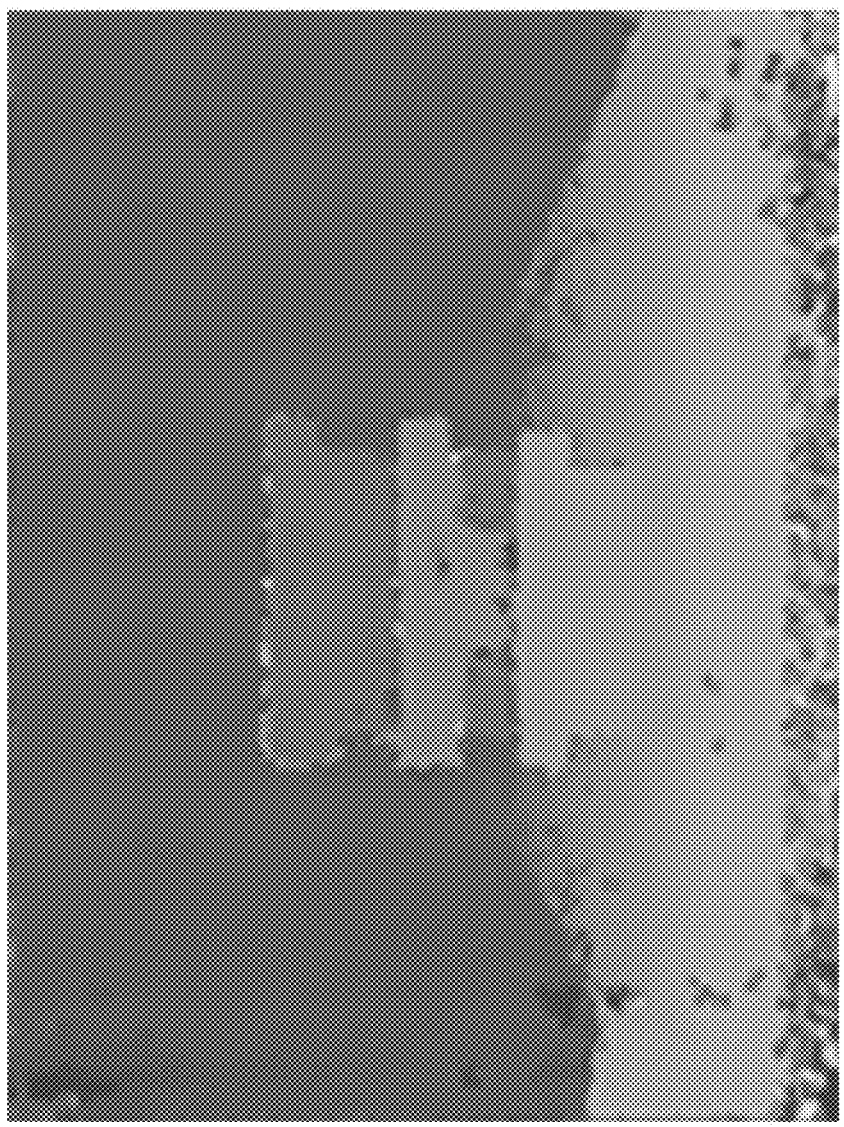
FIG. 4H shows a second composite depth map in a hybrid depth regularization process in accordance with an embodiment of the invention.

The result of median filtering the output from the first phase is shown in FIG. 4F. In this median-filtered depth map 450, much of the noise has been removed and the artifacts from SGM have been mitigated. The binary map of depth edges 460, obtained by edge detection on the median-filtered depth map followed by a dilation, is shown in FIG. 4G. In this example, most depth edges have been reliably detected with few false positives. The edges of the boxes and table have been marked, and the gradual recession of the table has been ignored. It can be observed here the importance of the median filter for noise reduction, as edge detection on FIG. 4E (prior to median filtering) typically contains more false positives. The output of the second phase, a second composite depth map 470 formed from FIGS. 4B, 4F and 4G, is shown in FIG. 4H. This result has much less noise than the first composite depth map 440 of FIG. 4E.

Figure 4I:
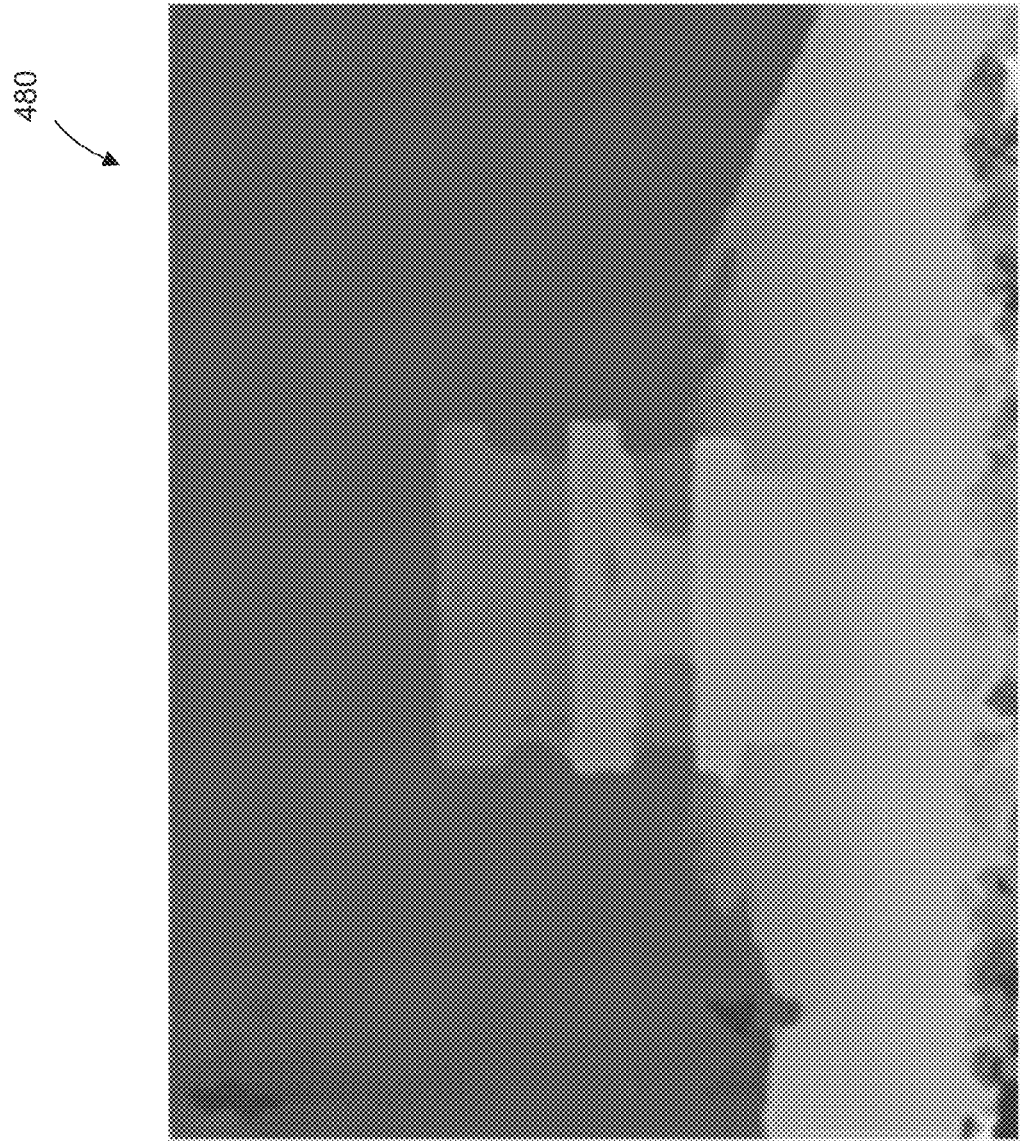
FIG. 4I shows a final regularized depth map in a hybrid depth regularization process in accordance with an embodiment of the invention.

In the final phase, the second composite depth map output from the second phase is filtered at pixel locations defined by positive values in edge map 460. The final regularized depth map 480 is shown in FIG. 4I. The bilateral filter primarily enforces edge consistency between the image and depth map, which may be considered a main difference between median-filtered depth map 450 and the final output 480. It may also correct errors due to false positives in the depth edge detection, as can be observed in comparing the final output 480 with that of the second composite depth map 470, the first composite depth map 440, and the original raw depth map 410.

Although specific inputs, intermediate results, and final outputs are described above for one particular implementation of a hybrid depth regularization process with reference to FIGS. 4A-4I, any of a variety of results may be observed in the implementation of processes appropriate to the requirements of a specific application in accordance with embodiments of the invention. Systems for performing hybrid depth regularization in accordance with embodiments of the invention are discussed further below.

Systems for Performing Hybrid Depth Regularization

Systems for performing hybrid depth regularization in accordance with various embodiments of the invention can be located anywhere within a network. As noted above, the techniques for performing hybrid depth regularization are particularly effective with respect to improving depth map quality, and thus 3D displays, in AR contexts with stereo camera configurations. Accordingly, the cameras that capture the images can themselves be configured via software as image processing systems capable of performing hybrid depth regularization on captured images either automatically and/or at the direction of the user. In a number of embodiments, images and/or 3D environments can be shared over networks using a number of different communication techniques including (but not limited to) a synchronized content management system (i.e. a server that automatically coordinates the copying of images from one device to another) in the context of, for example, online multi-player games. In many embodiments, a server that receives stereo images captured by cameras can be configured by software to perform hybrid depth regularization. As can readily be appreciated, almost any computing device within a network can be configured to perform perspective distortion correction as appropriate to the requirements of specific applications in accordance with various embodiments of the invention.

Figure 9:
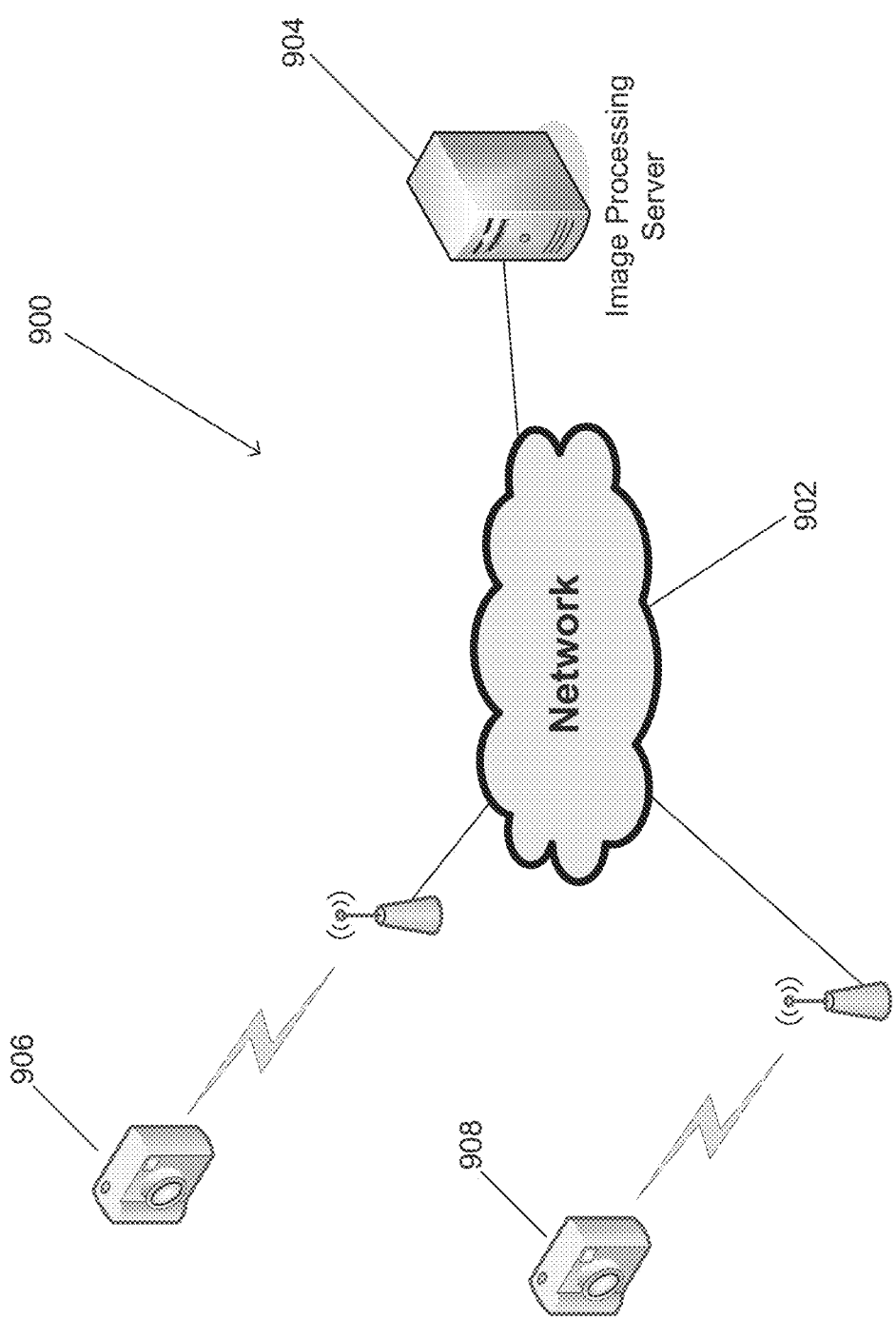
FIG. 9 conceptually illustrates a system including image processing systems configured to perform hybrid depth regularization in accordance with an embodiment of the invention.

Computing devices configured to capture images and perform hybrid depth regularization in accordance with various embodiment of the invention are illustrated in FIG. 9. The system 900 includes a number of cameras 906 and 908 configured to capture image data and corresponding depth map data. Although separate cameras are illustrated, one can readily appreciate that any device for capturing two or more images of a scene from different viewpoints, such as but not limited to a mobile phone handset, a web cam, and/or a headset or goggles with two cameras, can be utilized to capture, transmit, and/or process images in accordance with several embodiments of the invention. The cameras 906 and 908 may include two similar cameras, one color and one black-and-white camera, the black-and-white camera may also image within at least a portion of the near infrared spectrum, two similar cameras with different fields of view, and/or any other configuration of cameras capable of capturing stereo images. Furthermore, depth regularization processes similar to those described above can be applied to depth maps using a single moving camera and/or any of a variety of other camera systems that can capture depth information and image data.

The cameras 907 and 908 can transmit the image data and depth map data to an image processing server 904 via a network 902. Any of the computing devices within the system 900 can potentially be utilized to perform hybrid depth regularization. In a number of embodiments, the cameras 906 and 908 (or device encompassing both cameras) include software that configures the cameras to perform hybrid depth regularization on images captured or stored by the cameras. In several embodiments, the image processing server 904 can perform hybrid depth regularization on images received from cameras. The final regularized depth map, and/or display created using the regularized depth map, may be transmitted directly or indirectly to a display within the server 904, or remotely to other devices such as but not limited to a headset or other device including the camera array.

Figure 10:
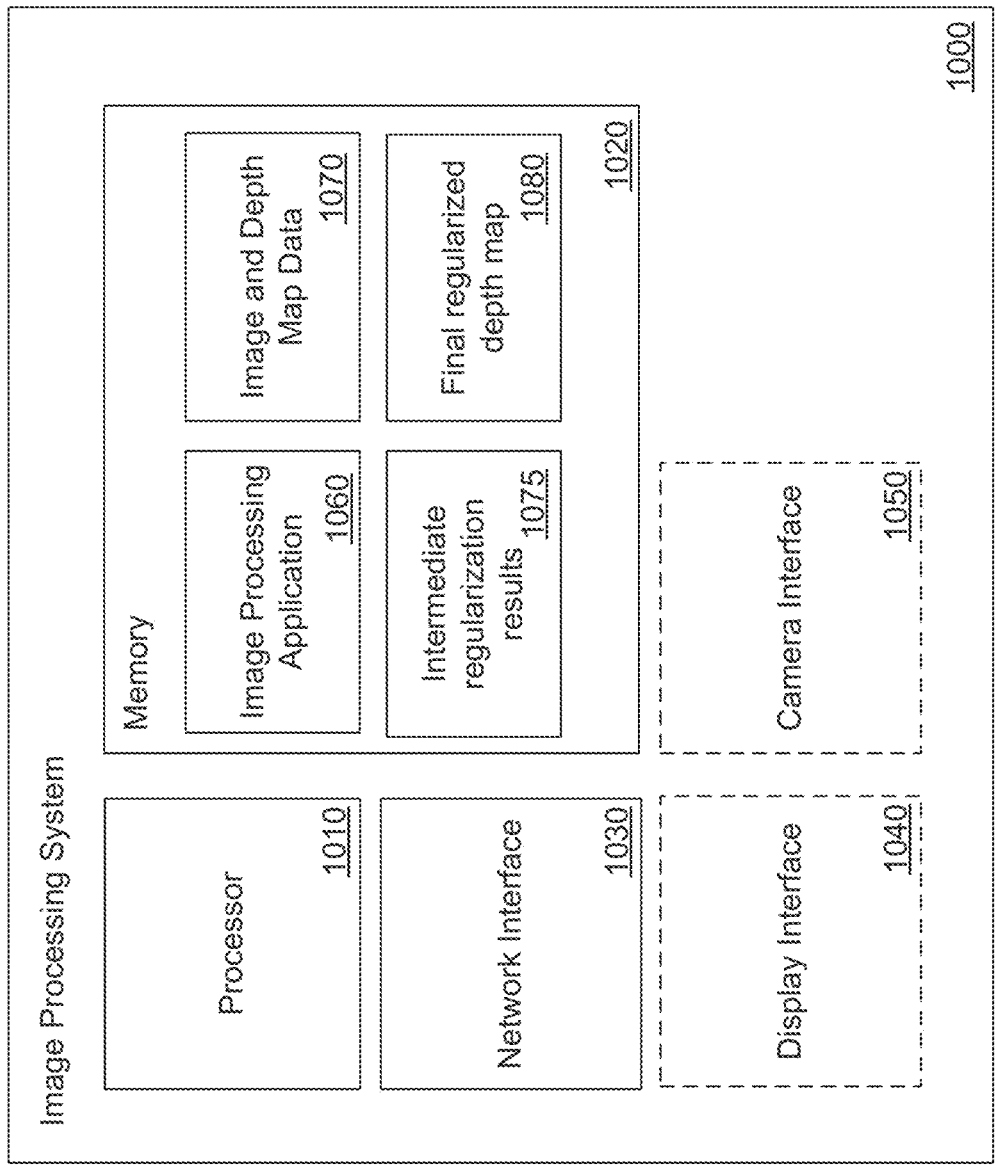
FIG. 10 conceptually illustrates an image processing system configured to perform hybrid depth regularization in accordance with an embodiment of the invention.

An image processing system that can be utilized to automatically perform hybrid depth regularization in accordance with an embodiment of the invention is illustrated in FIG. 10. The image processing system 1000 includes a processor 1010, memory 1020, a network interface 1030, an (optional) display interface 1040, and an (optional) camera interface 1050. Servers typically will not require a display interface or a camera interface and many computing devices that include displays do not include camera interfaces. The memory 1020 includes an image processing application 1060, image and depth map data 1070, intermediate regularization results 1075 and a final regularized depth map 1080. The image processing application can configure the processor to perform hybrid depth regularization using any of the techniques described above to produce a regularized depth map for use in 3D displays.

Although specific image sharing systems and image processing systems are described above with reference to FIGS. 9 and 10, any of a variety of computing devices can be utilized to acquire, share, and/or perform hybrid depth regularization on images as appropriate to the requirements of specific applications in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A depth sensing system, comprising:
a plurality of cameras;
a processor;
a memory containing an image processing application;
wherein the image processing application directs the processor to:
obtain image data for a plurality of images from multiple viewpoints using the plurality of cameras, wherein the image data for the plurality of images comprises a reference image and at least one alternate view image;
identify flat regions in the reference image;
generate initial depth estimates for pixels within the flat regions using the image data for the reference image and the image data for the at least one alternate view image using semi-global matching;
generate a confidence map describing reliability of the generated depth estimates; and
generate a regularized depth map by:
generating secondary depth estimates for pixels using the confidence map; and computing a composite depth map based upon the initial depth estimates and the secondary depth estimates.

2. The depth sensing system of claim 1, wherein to identify flat regions, the image processing application further directs the processor to classify pixels as being within the flat regions when a confidence value for a given pixel does not meet a threshold confidence value.

3. The depth sensing system of claim 1, wherein the image processing application further directs the processor to apply a smoothing filter to the composite depth map.

4. The depth sensing system of claim 1, wherein the image processing application further directs the processor to:
compute an edge map that indicates pixels within the reference image that form part of an edge; and
compute the composite depth map using the edge map.

5. The depth sensing system of claim 1, wherein to identify flat regions, the image processing application further directs the processor to:
rectify the reference image and the at least one alternative view image so that rows of pixels in the reference image and the at least one alternative view image correspond to epipolar lines between cameras in the plurality of cameras that captured the reference image and the at least one alternative view image;
determine the number of non-overlapping pixels associated with boundaries by summing non-overlapping pixels in each column of the reference image and the at least one alternative view image; and
identify edges of flat regions based upon columns that include a number of pixels below a threshold number of pixels.

6. The depth sensing system of claim 1, wherein the image processing application further directs the processor to apply an edge preserving filter to the composite depth map.

7. The depth sensing system of claim 1, wherein the semi-global matching is performed with downsampling.

8. The depth sensing system of claim 7, wherein the downsampling is at $1/16^{th}$ the resolution of a camera in the plurality of cameras that captured one of the reference image and the at least one alternate view image.

9. The depth sensing system of claim 1, wherein at least one alternate view image comprises two or more alternate view images, and the image processing application further directs the processor to:
compute a cost volume, for each pair of images containing the reference image and an alternate view image from the two or more alternate view images, with respect to the extent to which pixels from different images at different depths match from the reference image; and
aggregate costs from each cost volume using semi-global matching.

10. The depth sensing system of claim 1, wherein the image processing application further directs the processor to generate initial depth estimates for pixels outside of the flat regions using calculated parallax between pixels in the reference image and pixels in the at least one alternate view image.

11. A depth sensing method, comprising:
obtaining image data for a plurality of images from multiple viewpoints using the plurality of cameras, wherein the image data for the plurality of images comprises a reference image and at least one alternate view image;
identifying flat regions in the reference image;
generating initial depth estimates for pixels within the flat regions using the image data for the reference image and the image data for the at least one alternate view image using semi-global matching
generating a confidence map describing reliability of the generated depth estimates; and
generating a regularized depth map by:
generating secondary depth estimates for pixels using the confidence map; and
computing a composite depth map based upon the initial depth estimates and the secondary depth estimates.

12. The depth sensing method of claim 11, wherein the plurality of cameras, the processor, and the memory are part of a mobile phone.

13. The depth sensing method of claim 11, wherein identifying flat regions comprises classifying pixels as being within the flat regions when a confidence value for a given pixel does not meet a threshold confidence value.

14. The depth sensing method of claim 11, further comprising applying a smoothing filter to the composite depth map.

15. The depth sensing method of claim 11, further comprising:
computing an edge map that indicates pixels within the reference image that form part of an edge; and
computing the composite depth map using the edge map.

16. The depth sensing method of claim 11, wherein to identifying flat regions comprises:
rectifying the reference image and the at least one alternative view image so that rows of pixels in the reference image and the at least one alternative view image correspond to epipolar lines between cameras in the plurality of cameras that captured the reference image and the at least one alternative view image;
determining the number of non-overlapping pixels associated with boundaries by summing non-overlapping pixels in each column of the reference image and the at least one alternative view image; and
identifying edges of flat regions based upon columns that include a number of pixels below a threshold number of pixels.

17. The depth sensing method of claim 11, further comprising applying an edge preserving filter to the composite depth map.

18. The depth sensing method of claim 11, further comprising performing the semi-global matching with downsampling.

19. The depth sensing method of claim 18, wherein the downsampling is at $1/16^{th}$ the resolution of a camera in the plurality of cameras that captured one of the reference image and the at least one alternate view image.

20. The depth sensing method of claim 11, wherein at least one alternate view image comprises two or more alternate view images, the method further comprising:
computing a cost volume, for each pair of images containing the reference image and an alternate view image from the two or more alternate view images, with respect to the extent to which pixels from different images at different depths match from the reference image; and
aggregating costs from each cost volume using semi-global matching.

21. The depth sensing method of claim 11, further comprising generating initial depth estimates for pixels outside of the flat regions using calculated parallax between pixels in the reference image and pixels in the at least one alternate view image.

22. The depth sensing method of claim 11, wherein the plurality of cameras, are part of a mobile phone.

\* \* \* \* \*